US012810850B2

(12) United States Patent
Dambekodi et al.

(10) Patent No.: US 12,810,850 B2
(45) Date of Patent: Nov. 24, 2026

(54) GENERATING AND PROVIDING COMMUNICATION-RELATED RECOMMENDATIONS DURING COMMUNICATIONS FOR REAL-TIME AGENT ASSISTANCE

(71) Applicant: Qualtrics, LLC, Provo, UT (US)

(72) Inventors: Gautam Dambekodi, Sammamish, WA (US); Mohanish Kulkarni, Bothell, WA (US); Daniel Houtsma, Seattle, WA (US); Srivathsan Varadarajan, Mercer Island, WA (US); Aaron Johnston, Seattle, WA (US); Matthew Primmer, Mountlake Terrace, WA (US); Hemant Modi, Wellesley, MA (US); Frederick Richards, III, Washington, DC (US); Nikhil Kamath, Seattle, WA (US); Nicole Martin, Washington, DC (US); Ian Sowle, Seattle, WA (US); William Yang, Seattle, WA (US); Srinath Sridharan, Sammamish, WA (US); Jeffery Ni, Seattle, WA (US); Ivan Volonsevich, Herndon, VA (US); Ashish Naik, Arlington, VA (US); Tushar Deshpande, McLean, VA (US); Divya Viswanathan, Seattle, WA (US)

(73) Assignee: Qualtrics, LLC, Provo, UT (US)

( * ) Notice: Subject to any disclaimer, the term of this patent is extended or adjusted under 35 U.S.C. 154(b) by 128 days.

(21) Appl. No.: 18/438,226

(22) Filed: Feb. 9, 2024

(65) Prior Publication Data

US 2025/0259625 A1 Aug. 14, 2025

(51) Int. Cl.
*G10L 15/183* (2013.01)
*G06F 16/953* (2019.01)
(Continued)

(52) U.S. Cl.
CPC .......... *G10L 15/183* (2013.01); *G06F 16/953* (2019.01); *G10L 15/04* (2013.01);
(Continued)

(58) Field of Classification Search
USPC .................................................... 704/1–504
See application file for complete search history.

(56) References Cited

U.S. PATENT DOCUMENTS 7,925,496 B1 4/2011 Rubin
10,871,872 B2 * 12/2020 Bhardwaj ............ G06F 3/0488
(Continued)

OTHER PUBLICATIONS

U.S. Appl. No. 18/438,230, Jan. 2, 2026, Office Action.
(Continued)

*Primary Examiner* — Marcus T Riley
(74) *Attorney, Agent, or Firm* — Keller Preece PLLC

(57) ABSTRACT

The present disclosure relates to systems, non-transitory computer-readable media, and methods for using artificial intelligence to facilitate electronic communication between participants. For example, in one or more embodiments, the disclosed systems perform operations to generate and provide relevant notifications to a client device participating in a communication as the communication is ongoing. In particular, during the communication, the disclosed systems can utilize one or more artificial intelligence models to analyze a communication stream, generate a transcript, enrich the transcript with contextual information, and/or retrieve digital content for use in generating and providing notifications. The disclosed systems can provide the notifications to the participating client device during the communication to assist with the discussion.

20 Claims, 15 Drawing Sheets

(51) Int. Cl.

| | |
|---|---|
| ***G06F 40/134*** | (2020.01) |
| ***G10L 15/04*** | (2013.01) |
| ***G10L 15/08*** | (2006.01) |
| ***G10L 15/18*** | (2013.01) |
| ***G10L 15/30*** | (2013.01) |

(52) U.S. Cl.
CPC .......... *G10L 15/1815* (2013.01); *G10L 15/30* (2013.01); *G06F 40/134* (2020.01); *G10L 2015/088* (2013.01)

(56) References Cited

U.S. PATENT DOCUMENTS

| | | | | |
|---|---|---|---|---|
| 11,314,942 | B1 * | 4/2022 | Selfridge | G10L 15/22 |
| 11,392,970 | B2 * | 7/2022 | BaderEddin | H04M 3/563 |
| 12,008,332 | B1 * | 6/2024 | Gardner | G06F 40/56 |
| 12,079,585 | B1 | 9/2024 | Garvey et al. | |
| 12,342,102 | B2 * | 6/2025 | Chang | G06F 3/04883 |
| 12,380,287 | B2 * | 8/2025 | Gardner | G06F 40/56 |
| 12,405,964 | B2 | 9/2025 | Jin et al. | |
| 12,657,405 | B2 * | 6/2026 | Gardner | G06F 16/345 |
| 2005/0210105 | A1 | 9/2005 | Hirata et al. | |
| 2005/0228636 | A1 | 10/2005 | Erhart et al. | |
| 2016/0117943 | A1 * | 4/2016 | Rao | G06F 16/9535<br>434/351 |
| 2016/0132494 | A1 | 5/2016 | Ghosh et al. | |
| 2016/0241546 | A1 | 8/2016 | Arnady et al. | |
| 2017/0147828 | A1 | 5/2017 | Kurian et al. | |
| 2018/0182380 | A1 * | 6/2018 | Fritz | G10L 15/1815 |
| 2019/0121532 | A1 | 4/2019 | Strader et al. | |
| 2019/0166102 | A1 | 5/2019 | Chizi et al. | |
| 2019/0268379 | A1 | 8/2019 | Narayanaswamy et al. | |
| 2019/0317643 | A1 * | 10/2019 | Bhardwaj | G06F 3/167 |
| 2019/0371304 | A1 * | 12/2019 | Fritz | G10L 15/1815 |
| 2021/0043211 | A1 | 2/2021 | Leidner et al. | |
| 2021/0074275 | A1 * | 3/2021 | Fritz | G06F 40/295 |
| 2021/0377423 | A1 | 12/2021 | Park et al. | |
| 2022/0293107 | A1 * | 9/2022 | Leaman | G06Q 20/02 |
| 2023/0135179 | A1 * | 5/2023 | Mielke | G06N 5/022<br>704/232 |
| 2023/0164296 | A1 * | 5/2023 | Chang | G06F 3/0485<br>348/14.09 |
| 2023/0223026 | A1 * | 7/2023 | Grichnik | H04L 51/216<br>704/235 |
| 2023/0367960 | A1 | 11/2023 | Smus et al. | |
| 2024/0070251 | A1 * | 2/2024 | Maizels | G06F 21/32 |
| 2024/0079012 | A1 * | 3/2024 | Maizels | G06F 21/32 |
| 2024/0296295 | A1 | 9/2024 | Russell et al. | |
| 2024/0320684 | A1 | 9/2024 | Ramalingam et al. | |
| 2024/0346232 | A1 | 10/2024 | Asi et al. | |
| 2024/0370657 | A1 * | 11/2024 | Kurian | G06F 40/30 |
| 2024/0371367 | A1 | 11/2024 | Churgin et al. | |
| 2025/0005063 | A1 | 1/2025 | Kulshreshtha et al. | |
| 2025/0028899 | A1 | 1/2025 | Shetty et al. | |
| 2025/0061290 | A1 * | 2/2025 | Gardner | G06F 40/56 |
| 2025/0061291 | A1 * | 2/2025 | Gardner | G06F 16/345 |
| 2025/0078790 | A1 | 3/2025 | Balassanian et al. | |
| 2025/0252384 | A1 | 8/2025 | Vyas et al. | |
| 2025/0259006 | A1 * | 8/2025 | Dambekodi | G06F 40/35 |
| 2025/0259625 | A1 * | 8/2025 | Dambekodi | G06F 16/953 |
| 2026/0010738 | A1 * | 1/2026 | Gardner | G06F 40/56 |

OTHER PUBLICATIONS

U.S. Appl. No. 18/438,230, May 5, 2026, Office Action.
U.S. Appl. No. 18/438,230, mail date Sep. 23, 2026, Office Action.

* cited by examiner

GENERATING AND PROVIDING COMMUNICATION-RELATED RECOMMENDATIONS DURING COMMUNICATIONS FOR REAL-TIME AGENT ASSISTANCE

BACKGROUND

Recent years have seen significant advancement in hardware and software platforms that facilitate or enhance communication between participants. For instance, many conventional systems facilitate communication through at least one of various communication channels, such as by phone or video call or through email, text message, or online chat. Some conventional systems further provide additional features that can supplement the communication, such as features for creating and/or distributing a transcript to computing devices of the participants after the communication is complete. Despite these advances, conventional communication systems often exhibit a number of problems in relation to flexibility and efficiency.

Indeed, conventional communication systems are typically inflexible in that they offer limited functionality during a communication, particularly during a live communication (e.g., a phone conversation, a video call, or a live online chat). For instance, the available functionality of some conventional systems during a communication is often confined to a fixed set of core features, such as those for transmitting or recording the communication. While many conventional systems integrate one or more computing devices into their communication environments to leverage the expanded set of features generally offered by the device(s), these systems typically fail to fully integrate these features into the communication itself. For instance, a computing device employed by a conventional system may be limited to responding to manual input provided by a communication participant—such as input provided via a keyboard, mouse, or touchscreen.

Additionally, conventional communication systems are often inefficient. For instance, by largely limiting a computing device during a communication to responding to manual input from a participant, conventional systems typically require a significant number of user interactions with the computing device to make use of its features. As an example, to access digital content relevant to a communication, conventional systems may require interactions for opening an application and navigating its various windows or menus, formulating and submitting a query, selecting the digital content to view, and/or navigating the digital content itself. Where the user is unsure which digital content is relevant or where to find it, the number of interactions required can multiply. Further, conventional systems may require additional user interactions after a communication has ended. For example, some systems may require a participant to create a summary of a communication upon its completion. Such a process can include a significant amount of user interactions as the participant manually writes, edits, and submits the summary.

These along with additional problems and issues exist with regard to conventional communication systems.

SUMMARY

Embodiments of the present disclosure provide benefits and/or solve one or more of the foregoing or other problems in the art with systems, non-transitory computer-readable media, and methods that incorporate artificial intelligence and/or other computer-implemented models to flexibly and efficiently facilitate electronic communication between participants. For instance, the disclosed systems can leverage one or more artificial intelligence models to provide real-time assistance to a participant of a communication. To illustrate, in some cases, the disclosed systems utilize one or more artificial intelligence models to transcribe the communication in real time. Accordingly, during the communication, the disclosed systems can analyze and enrich the resulting transcript and generate relevant notifications that instruct the participant on appropriate action (e.g., appropriate communicative utterances), affirm actions (e.g., utterances) already taken, and/or provide knowledge that is relevant to discussion. In some embodiments, the disclosed systems use one or more additional models to generate a summary of the communication upon completion. For instance, the disclosed systems can utilize a generative artificial intelligence model (e.g., a large language model) or another computer-implemented model to generate a summary based on the completed transcript. In this manner, the disclosed systems flexibly integrate the functionality of computing devices into the communications between participants while efficiently reducing the user interactions typically required to leverage that functionality.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
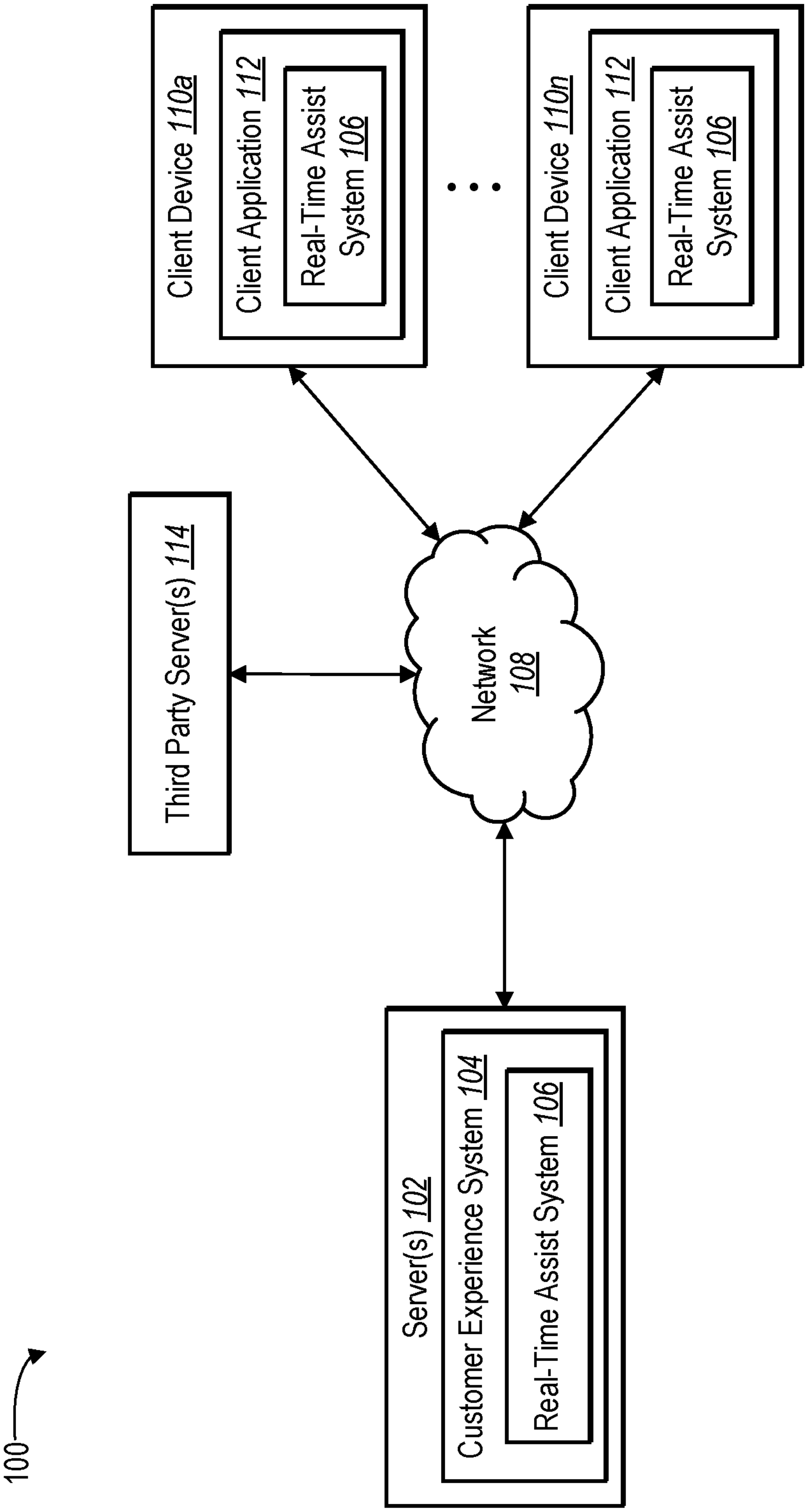
FIG. 1 illustrates an example environment in which real-time assist system operates in accordance with one or more embodiments.

One or more embodiments described herein include a real-time assist system that uses artificial intelligence to generate content that facilitates and enhances communication between participants. For example, in one or more embodiments, the real-time assist system generates artificial-intelligence-based recommendations or other notifications in real-time to assist a participant during the communication. In particular, the real-time assist system can generate the notification(s) based on the contents of the communication or other rules that have been established. To illustrate, the real-time assist system can generate prompts for actions to be taken (e.g., utterances to be communicated), such as those required by a protocol of an organization that the participant represents. The real-time assist system can additionally or alternative retrieve digital content that is relevant to the current discussion and provide one or more links that enable the participant to access the digital content during the communication. In some embodiments, the real-time assist system generates a summary for the communication based on its full transcript. For example, the real-time assist system can use a generative artificial intelligence model or one or more models in combination with a summary template to generate the summary.

To illustrate, in one or more embodiments, the real-time assist system receives, from a client device of a first user and during a communication between the first user and a second user, a communication stream containing contents of the communication. Additionally, the real-time assist system generates, from the communication stream and during the communication, a transcript having a textual representation of the contents of the communication. Using the transcript and during the communication, the real-time assist system generates a notification for the first user with respect to the contents of the communication. The real-time assist system further provides the notification for display within a graphical user interface of the client device of the first user during the communication.

As another example, in one or more embodiments, the real-time assist system receives, from a client device of a first user, a communication stream containing contents of a communication between the first user and a second user. Additionally, the real-time assist system generates, from the communication stream, a transcript having a textual representation of the contents of the communication. Using the transcript, the real-time assist system generates a communication summary that describes the contents of the communication. The real-time assist system further provides the communication summary for display within a graphical user interface of the client device of the first user.

As just mentioned, in some embodiments, the real-time assist system generates one or more notifications for a participant of a communication (i.e., a user) in real time. In other words, the real-time assist system generates and provides the notification(s) during the communication. For instance, in some cases, the real-time assist system processes a data stream of the ongoing communication (i.e., a communication stream) to generate and provide notification(s) in real time.

To illustrate, the real-time assist system can generate a transcript for the communication as the communication is ongoing, such as by creating transcript snippets based on segments of the communication. In some cases, the real-time assist system further enriches the transcript (e.g., the transcript snippets) in real time by incorporating contextual information, such as indications of sentiment, emotion, or topic. The real-time assist system can utilize artificial intelligence models in transcribing the communication, such as by using a speech-to-text model (e.g., a transcription model) to generate the transcript from the communication or a natural language processing model to generate the enriched transcript.

Accordingly, the real-time assist system can generate a notification based on the transcript (e.g., the enriched transcript). In particular, in some instances, the real-time assist system generates a notification based on one or more pre-configured rules and the contents of the transcript. For instance, the real-time assist system can generate a notification based on a word or phrase that was mentioned or based on a sentiment that was attached to an utterance of a participant. In some cases, the real-time assist system generates a notification based on other pre-configured rules, such as a duration of the communication.

The real-time assist system can generate a variety of notifications. For example, the real-time assist system can generate a coaching recommendation that prompts one or more action (e.g., utterances) from the participant receiving the notification. In some cases, the real-time assist system generates a notification that affirms or encourages previous action (e.g., utterances). Further, in some instances, the real-time assist system generates a notification that includes a link to a digital content item that is relevant to current discussion. For example, the real-time assist system can generate a search query and a generate the notification to include a link to a digital content item retrieved in response to the search query.

As further mentioned, in one or more embodiments, the real-time assist system generates a communication summary of a communication based on a transcript of the communication. In some cases, the real-time assist system generates the communication system using a generative artificial intelligence model, such as a large language model. In some embodiments, the real-time assist system uses one or more categorization models in combination with a summary template to generate the communication summary. In some embodiments, the real-time assist system uses a large language model to generate rules for the one or more categorization models.

The real-time assist system provides several advantages over conventional communication systems. For instance, the real-time assist system operates more flexibly when compared to conventional systems. In particular, the real-time assist system offers more flexible, expanded functionality while a communication—particularly a live (e.g., synchronous) communication—is ongoing. Additionally, the real-time assist system more flexibly integrates the features of computing devices within the communication environment to provide this expanded functionality. Indeed, by using a computing device of a user participating in a communication to generate notifications to guide the user's participation during the communication, the real-time assist system offers a more flexible set of computer-implemented features compared to the limited set often offered by conventional systems. For example, the real-time assist system offers additional real-time features for transcribing a communication stream, enriching a transcript of the communication, conducting a search for digital content based on the contents of a transcript, and/or generating a notification that enhances the communication by enabling the user to effectively engage with the other participants.

Additionally, the real-time assist system provides improved efficiency when compared to conventional communication systems. Indeed, by leveraging artificial intelligence to generate notifications in response to characteristics of a communication (e.g., duration, content, and/or contextual data), the real-time assist system provides intelligent, automated outputs that would typically require multiple user interactions under conventional systems. For instance, the real-time assist system can provide digital content that is relevant to a discussion without the need for user input to locate retrieve the digital content. Thus, the real-time assist system reduces the number of user interactions that are required in obtaining these outputs. The real-time assist system can further leverage generative artificial intelligence or other models to generate content-such as communication summaries-without the need for user interaction.

As illustrated by the foregoing discussion, the present disclosure utilizes a variety of terms to describe features and advantages of the real-time assist system. Additional detail is now provided regarding the meaning of such terms. For example, as used herein, the term "communication" refers a conversation or other exchange of information between at least two users participating in the communication. In particular, a communication can refer to a conversation or other exchange of information over a communication channel. For instance, a communication can include, but is not limited to, a discussion or other exchange of information taking place via telephone, cellphone, text message, email, video call, or online chat. Indeed, a communication can involve a live, synchronous communication (e.g., a phone call, a video call, or a live online chat) or an asynchronous communication (e.g., a text message or email conversation). Further, a communication can involve one or more computing devices. For instance, in some cases, a computing device transmits the communication or supplements the communication by enabling a participating user to access additional computer functionality during the communication.

Additionally, as used herein the term "contents of a communication" (or simply "contents") refers to statements of the communication. In other words, the contents of a communication can refer to what is said during the communication. Indeed, in some cases, the contents of a communication include explicit statements (e.g., utterances) made during a conversation. Further, in some cases, the contents include other information exchanged as part of the conversation, such as files, documents, or links that are exchanged.

Further, as used herein, the term "communication stream" refers to a stream of data (e.g., digital data) representing a communication. In particular, a communication stream can refer to a stream of data representing the contents of a communication. For example, a communication stream can include a stream of data that is created and transmitted during the communication. To illustrate, in some cases, a communication stream includes a live stream of data that is created and/or transmitted during a live communication (e.g., a phone conversation, a video call, or a live online chat).

As used herein, the term "contextual information of a communication" (or simply "contextual information" refers to information that provides context to the communication. In particular, contextual information can include information that contextualizes the contents of a communication. Contextual information can include information that was explicitly stated during the communication or can include information that is derived from the explicit statements made during the communication. In some instances, contextual information is derived from characteristics of a communication other than what is explicitly stated (e.g., how the statement was made). Examples of contextual information include, but are not limited to, topic (e.g., reason for the communication), emotion, sentiment, tone, or action item.

As used herein, the term "transcript" refers to a textual representation of a communication. In particular, a transcript can refer to a textual representation of the contents of a communication. Indeed, a transcript can include a textual representation of statements made during the communication. In some cases, a transcript attributes (e.g., via a label) each statement represented therein to a user participating in the communication. In some instances, a transcript also includes a textual representation of other information (e.g., files, documents, or links) exchanged during the communication. In some cases, a transcript includes a digital document containing the textual representation.

Relatedly, as used herein, the term "transcript snippet" includes a segment of a transcript. In particular, a transcript snippet can refer to a textual representation of a segment of the contents of a communication. For instance, a transcript snippet can include a textual representation of a portion or portions of a conversation related to a particular topic. In some cases, a transcript snippet includes a textual representation of a single statement, word, or phrase, provided by a user participating in a communication. In some instances, a transcript snippet corresponds to a turn of a user participating in a communication. For instance, a transcript snippet can include a textual representation that corresponds to a portion of a communication that begins and ends with statements (e.g., statements made via speech or text) of a particular user without interruption by another user participating in the communication.

As used herein, the term "enriched transcript" refers to a transcript that has been modified to include contextual information. In particular, an enriched transcript can include a transcript that has been modified to include a textual representation of the contents of a communication and the contextual information corresponding to the contents. Relatedly, as used herein, the term "enriched transcript snippet" refers to a transcript snippet that has been modified to include contextual information, such as contextual information for the segment of a communication represented by the enriched transcript snippet.

Additionally, as used herein, the term "redacted transcript" refers to a transcript that has been modified to remove one or more pieces of information. In particular, a redacted transcript can include a transcript that has had any personally identifiable information removed. Relatedly, as used herein, the term "redacted enriched transcript" includes an enriched transcript that has been modified to remove one or more pieces of information, such as personally identifiable information.

Further, as used herein, the term "metadata of a communication" (or simply "metadata" or "communication metadata") refers to information about the communication itself. In particular, metadata can refer to information that describes the communication and/or the users participating in the communication. To illustrate, metadata can include, but is not limited to, duration of the communication, date of the communication, time(s) of day at which the communication occurred, names or other personally identifiable information of the users participating in the communication, or an account number of a user participating in the communication.

As used herein, the term "communication summary" refers to a summarization of a communication. For instance, a communication summary can refer to a summary of the contents of a communication or contextual information or metadata corresponding to the communication. A communication summary can quote or paraphrase (portions of) the communication. A communication summary can recite key points of a communication, such as a reason for the communication (e.g., a reason a participating user initiated the communication), a topic of conversation, an action item to be taken as a result of the communication, or a resolution to one or more problems brought up during the course of the communication. Further, a communication summary can include a textual summarization or an audio summarization of a communication.

Additionally, as used herein the term "summary template" includes a template for creating communication summaries. For instance, a summary template can include a content structure for organizing the content of a communication summary. In some cases, a summary template further includes one or more entry fields that are designated for content entries. For example, in some implementations, a communication summary includes an entry field and some natural language associated with the entry field (e.g., natural language describing the content to be entered into the entry field). Relatedly, as used herein, the term "content entry" refers to content entered into a content field of a summary template. For instance, a content entry can include, but is not limited to, a call reason entry, an action item entry, or a topic entry.

Additionally, as used herein, the term "pre-configured rule" refers to a pre-established rule for processing information associated with a communication. For instance, a pre-configured rule can refer to a pre-established rule for processing a communication stream, a textual representation of the contents (or a portion of the contents) of a communication, contextual information corresponding to a communication, or metadata associated with a communication. To illustrate, a pre-configured rule can include, but is not limited to, a pre-established rule for generating a notification or a communication summary (e.g., a content entry for a communication summary) based on information associated with a communication. In some cases, a pre-configured rule includes a default rule, a rule created based on user input, or a rule generated via artificial intelligence, such as through the use of a large language model. Further, in some instances, a pre-configured rule is modifiable.

Further, as used herein, the term "categorization mode" includes a computer-implemented model that identifies a category for a communication or a portion of a communication. For instance, a categorization model can refer to a computer-implemented model that analyzes a transcript (e.g., a transcript snippet) or an enriched transcript (e.g., an enriched transcript snippet) of a communication and determines a category based on the analysis. In some cases, a categorization model is associated with one or more pre-configured rules and determines a category based on the pre-configured rule(s). For example, in some cases, a categorization model determines a category based on an utterance represented within a transcript or a sentiment represented within an enriched transcript.

As used herein, the term "utterance" refers to an explicit declaration conveyed as part of a communication. For instance, an utterance can include a word or phrase explicitly stated during the conversation. Indeed, an utterance can include a statement spoken during a spoken conversation (e.g., a phone call or video call) or a statement written during a text message, email, or online chat conversation. Relatedly, as used herein, the term "triggering utterance" refers to an utterance that triggers a pre-configured rule. For instance, a triggering utterance can refer to an utterance that, when included within a communication (e.g., as represented within a transcript or enriched transcript for the communication) triggers operation of the real-time assist system in accordance with a pre-configured rule.

As used herein, the term "digital content item" more refers to a collection of data or a portion of the data represented within the collection. For instance, a digital content item can include a digital file, such as an audio file, an image file, a text file, or a multi-media file. In some cases, a digital content item includes a portion of a digital file, such as an audio segment of an audio file (e.g., a song on a playlist), a digital image of an image file (e.g., a single image from a collection of images), a section within a text file (e.g., an article within a text file comprising a collection of articles), or a section of a multi-media file (e.g., a portion of an audio-visual file). In some cases, a digital content item includes a portion of online content or content otherwise stored on or transmitted through one or more server(s), such as a social media thread or portion of a social media thread. In some cases, a digital content item includes a portion of content stored locally on a device or as part of a local network (e.g., an intranet).

Additionally, as used herein, the term "digital content source" refers to a source of digital content items. In particular, a digital content source can refer to a source from which digital content items are created, stored, maintained, transmitted, and/or retrieved. Examples of digital content sources include, but are not limited to, social media sites, databases, online repositories, local storage, remote storage, or communication threads.

Further, as used herein, the term "large language model" refers to an artificial intelligence model capable of processing and generating natural language text. In particular, a large language model can refer to a generative artificial intelligence model for generating text outputs. In some embodiments, a large language model is trained on large amounts of data to learn patterns and rules of language. As such, a large language model post-training can generate text similar in style and content to input data. Examples of large language models include ChatGPT, BLOOM, Bard AI, LaMDA, or DialoGPT. In some cases, a large language model includes a model considered to include artificial intelligence features, such as a neural network.

Additional details regarding the real-time assist system will now be provided with reference to the figures. For example, FIG. 1 illustrates a schematic diagram of an exemplary system environment ("environment") 100 in which a real-time assist system 106 operates. As illustrated in FIG. 1, the environment 100 includes a server(s) 102, a network 108, client devices 110*a*-110*n*, and a third-party server(s) 114.

Although the environment 100 of FIG. 1 is depicted as having a particular number of components, the environment 100 is capable of having any number of additional or alternative components (e.g., any number of server devices, client devices, third-party servers, or other components in communication with the real-time assist system 106 via the network 108). Similarly, although FIG. 1 illustrates a particular arrangement of the server(s) 102, the network 108, the client devices 110*a*-110*n*, and the third-party server(s) 114, various additional arrangements are possible.

The server(s) 102, the network 108, the client devices 110*a*-110*n*, and the third-party server(s) 114 are communicatively coupled with each other either directly or indirectly (e.g., through the network 108 discussed in greater detail below in relation to FIG. 11). Moreover, the server(s) 102, the client devices 110*a*-110*n*, and the third-party server(s) 114, each include one of a variety of computing devices (including one or more computing devices as discussed in greater detail with relation to FIG. 11).

As mentioned above, the environment 100 includes the server(s) 102. In one or more embodiments, the server(s) 102 generates, stores, receives, and/or transmits data, including notifications and/or communication summaries. In one or more embodiments, the server(s) 102 comprises a data server. In some implementations, the server(s) 102 comprises a communication server or a web-hosting server.

In one or more embodiments, the customer experience system 104 provides functionality that facilitates a communication between participants. For example, in some implementations, the customer experience system 104 provides functionality for transmitting and/or recording a communication between users. In some embodiments, the customer experience system 104 provides functionality that more specifically assists one user in communicating with another user. For instance, the customer experience system 104 can provide functionality that enables a device of one of the users (e.g., a device used to transmit the communication or a separate, supplementary device) to display information relevant to the communication (e.g., to display information for the other user(s) participating in the communication, such as identifying information or account information).

Additionally, the server(s) 102 includes the real-time assist system 106. In one or more embodiments, the real-time assist system 106, via the server(s) 102, provides real-time assistance to a user participating in a communication. For instance, in some cases, the real-time assist system 106, via the server(s) 102, analyzes a communication stream and generates one or more notifications for display on a client device of a participating user during the communication. To illustrate, the real-time assist system 106 can generate notifications that prompt one or more actions (e.g., utterances) from the user, affirm previous actions (e.g., utterances) by the user, or provide access to digital content items that are relevant to the communication. In some cases, via the server(s) 102, the real-time assist system 106 generates a communication summary upon completion of a communication and enables a participating user to provide edits.

In one or more embodiments, the client devices 110*a*-110*n* each include a computing device that can access, edit, implement, modify, store, and/or provide, for display, digital content, such as digital content items, notifications, and communication summaries. For example, the client devices 110*a*-110*n* can each include a smartphone, tablet, desktop computer, laptop computer, head-mounted-display device, or other electronic device. The client devices 110*a*-110*n* can each include one or more applications (e.g., the client application 112) that can access, edit, implement, modify, store, and/or provide, for display, digital content, such as digital content items, notifications, and communication summaries. For example, in some embodiments, the client application 112 includes a software application installed on one or more of the client devices 110*a*-110*n*. In other cases, however, the client application 112 includes a web browser or other application that accesses a software application hosted on the server(s) 102.

In one or more embodiments, the third-party server(s) 114 provide additional functionality accessed by the real-time assist system 106 in its operation. For instance, in some cases, the third-party server(s) 114 hosts a transcription model used by the real-time assist system 106 to generate a transcription from a communication stream. In some instances, the third-party server(s) hosts a generative artificial intelligence model, such as a large language model, used by the real-time assist system 106 to generate communication summaries or pre-configured rules to be implemented via one or more categorization models. In one or more embodiments, the third-party server(s) 114 includes a content server and/or a data collection server.

The real-time assist system 106 can be implemented in whole, or in part, by the individual elements of the environment 100. Indeed, as shown in FIG. 1 the real-time assist system 106 can be implemented with regard to the server(s) 102 and/or at the client devices 110*a*-110*n*. In particular embodiments, the real-time assist system 106 on the client devices 110*a*-110*n* comprises a web application, a native application installed on the client devices 110*a*-110*n* (e.g., a mobile application, a desktop application, a plug-in application, etc.), or a cloud-based application where part of the functionality is performed by the server(s) 102.

In additional or alternative embodiments, the real-time assist system 106 on the client devices 110*a*-110*n* represents and/or provides the same or similar functionality as described herein in connection with the real-time assist system 106 on the server(s) 102. In some implementations, the real-time assist system 106 on the server(s) 102 supports the real-time assist system 106 on the client devices 110*a*-110*n*.

In some embodiments, the real-time assist system 106 includes a web hosting application that allows any of the client devices 110*a*-110*n* to interact with content and services hosted on the server(s) 102. To illustrate, in one or more implementations, the client device 110*n* accesses a web page or computing application supported by the server(s) 102. The client device 110*n* provides input to the server(s) 102, such as an utterance of a user of the client device 110*n*. In response, the real-time assist system 106 on the server(s) 102 utilizes the provided input to generate a notification. The server(s) 102 then provides the notification to the client device 110*n*.

In some embodiments, though not illustrated in FIG. 1, the environment 100 has a different arrangement of components and/or has a different number or set of components altogether. For example, in certain embodiments, the client devices 110*a*-110*n* communicate directly with the server(s) 102 bypassing the network 108.

Figure 2:
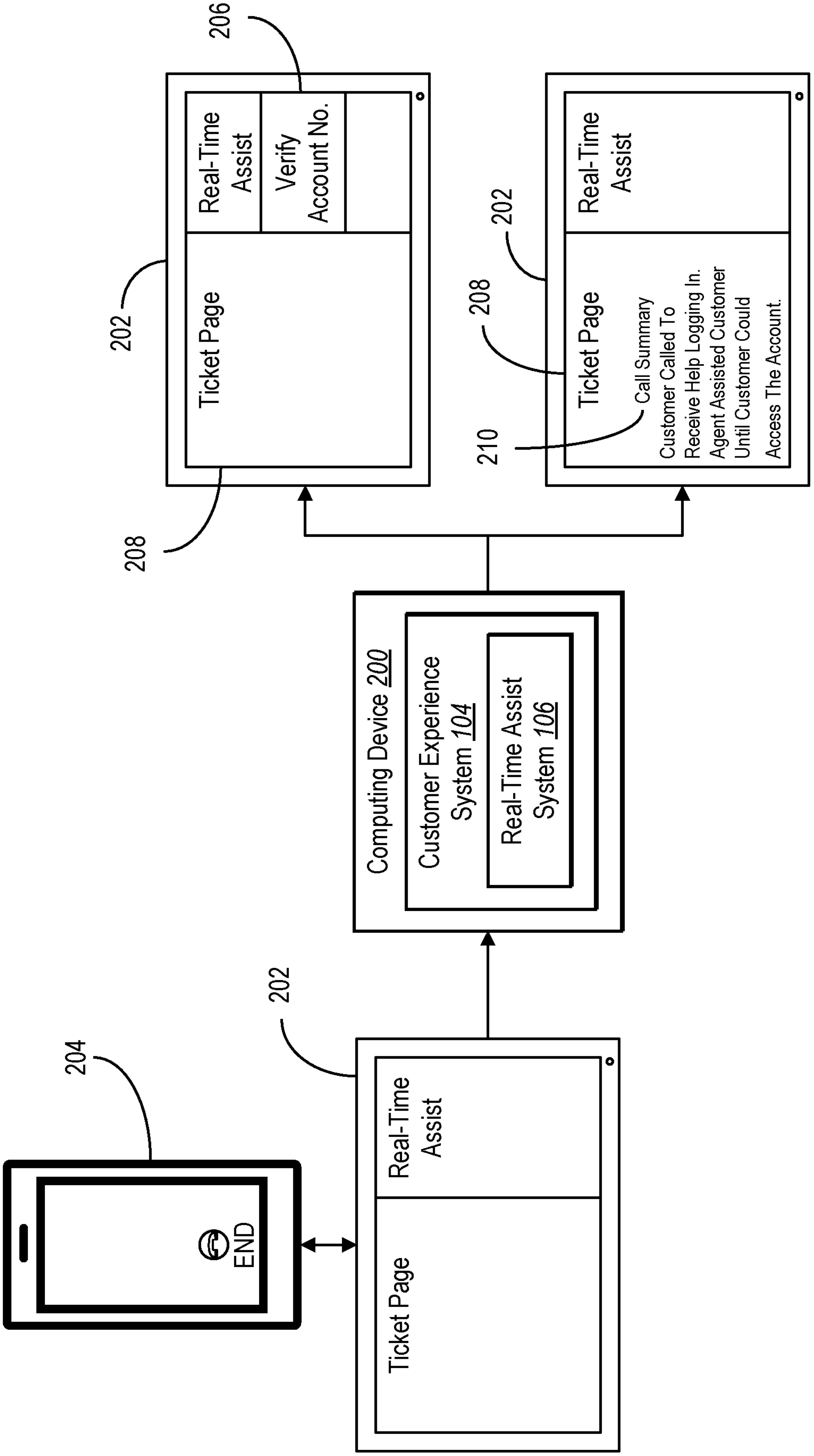
FIG. 2 illustrates an overview diagram of the real-time assist system generating content that facilitates or enhances a communication between multiple participating users in accordance with one or more embodiments.

As previously mentioned, in one or more embodiments, the real-time assist system 106 generates content that facilitates or enhances communication between multiple users. In particular, the real-time assist system 106 can generate content in real time, as the communication is ongoing, or after the communication has completed. FIG. 2 illustrates an overview diagram of the real-time assist system generating content that facilitates or enhances a communication between multiple participating users in accordance with one or more embodiments.

Indeed, as shown in FIG. 2, a first client device 202 is in communication with a second client device 204. In particular, users participating in the communication use the first client device 202 and the second client device 204 to communicate with one another. In other words, a first user communicates via the first client device 202 and a second user communicates via the second client device 204. For instance, in some cases, the first client device 202 transmits the utterances of the first user to the second client device 204 and receives the utterances of the second user as transmitted by the second client device 204. Likewise, in some instances, the second client device 204 transmits the utterances of the second user to the first client device 202 and receives the utterances of the first user as transmitted by the first client device 202. Though FIG. 2 illustrates two participants in the communication, the communication can involve more than two participants (with corresponding client devices) in various embodiments.

The description of FIG. 2 and the figures that follow largely discuss operation of the real-time assist system 106 during a live, synchronous communication, such as a phone call, a video call, or a live online chat. As previously mentioned, however, the real-time assist system 106 can similarly operate with reference to asynchronous communications, such as communications via email or text message.

FIG. 2 illustrates the second client device 204 as a smartphone, though the second client device 204 can include one of various other computing devices in various embodiments. For example, the second client device 204 can include a desktop computer, a laptop computer, a tablet, or another computing device. In some embodiments, a device other than the second client device 204 communicates with the first client device 202. For instance, in some implementations, a non-computing device, such as a telephone device operating on a traditional landline without computer functionality, communicates with the first client device 202 in place of or in addition to the second client device 204.

In addition, FIG. 2 illustrates the first client device 202 as a desktop computer, though the first client device 202 can include one of various other computing devices in various embodiments. In some cases, the first client device 202 communicates with the second client device 204 (e.g., via a direct connection or through a server). In particular, the first client device 202 transmits the utterances of the first user to the second client device 204 and receives the utterances of the second user as transmitted by the second client device 204. To illustrate, in some embodiments, the first client device 202 includes functionality for establishing and maintaining a communication channel with the second client device 204, such as a channel that enables communication via a phone call, a text message, a video call, email, or an online chat.

In some implementations, however, the first client device 202 is connected to another device or set of devices that communicate with the second client device 204. In other words, in some embodiments, the first client device 202 is connected to one or more devices that establish and maintain communications with the second client device 204—such as one or more devices of a dedicated phone system. Thus, in some cases, the first client device 202 receives the utterances of the first user and the second user via the connected device(s). In other words, in some cases, the connected device(s) communicate with the second client device 204, and the first client device 202 is tapped into the communication.

As shown in FIG. 2, the real-time assist system 106 operates on a computing device 200. For instance, the real-time assist system 106 can operate on the first client device 202 or another computing device. For instance, in some cases, the computing device 200 includes a sever that is connected to the first client device 202 and/or one or more other devices (e.g., one or more dedicated phone system devices) that are connected to the first client device 202. In some cases, the computing device 200 is tapped into the communication between the first client device 202 and the second client device 204. In some embodiments, the communication is transmitted through the computing device 200.

Additionally, as shown in FIG. 2, the real-time assist system 106 analyzes the communication between the first client device 202 and the second client device 204. For instance, in some cases, the real-time assist system 106 analyzes the communication as the communication is ongoing. As such, the real-time assist system 106 can provide assistance via the first client device 202 during the communication. In some instances, the real-time assist system 106 analyzes the communication after its completion. Thus, the real-time assist system 106 can provide functionality that facilitates follow-up to the communication.

Indeed, as shown in FIG. 2, based on the analysis of the communication, the real-time assist system 106 generates and provides a notification 206 for display within a graphical user interface 208 of the first client device 202. For instance, in some cases, the real-time assist system 106 generates and provides the notification 206 during the communication to facilitate, encourage, or affirm the participation of the first user in the communication. As further shown in FIG. 2, the real-time assist system 106 additionally or alternatively generates and provides a communication summary 210 for display within the graphical user interface 208 of the first client device 202. For example, in some embodiments, the real-time assist system 106 generates and provides the communication summary 210 upon completion of the communication.

To provide an example of the real-time assist system 106 operating in accordance with the illustration of FIG. 2, in one or more embodiments, the first client device 202 includes a client device associated with an agent of an organization (e.g., a customer service representative from the organization). Further, the second client device 204 can include a client device associated with a customer of the organization. For instance, in some cases, the customer associated with the second client device 204 has purchased a product or service from the organization or has an account with the organization (e.g., an online account of a digital system created and/or maintained by the organization). Accordingly, the communication between the first client device 202 and the second client device 204 can involve discussion of a subject related to the organization represented by the agent associated with the first client device 202. For instance, the communication can involve a discussion regarding a product purchased from the organization (e.g., a missing, damaged, or unsatisfactory product). As another example, the communication can involve a discussion regarding an account with the organization (e.g., creating an account, ending an account, or trouble with accessing an account).

Thus, in such an example, the real-time assist system 106 can operate to assist the agent representing the organization via the first client device 202. In particular, as FIG. 2 illustrates, the real-time assist system 106 can assist the agent during the communication by generating and providing one or more notifications for display by the first client device 202. For instance, the real-time assist system 106 can generate a notification that prompts one or more utterances or other actions from the agent or a notification that includes a link to a digital content item that is relevant to the discussion. Further, as FIG. 2 illustrates, the real-time assist system 106 can assist the agent after the communication by generating and providing a communication summary for display by the first client device 202. Thus, the real-time assist system 106 can react to the communication (e.g., either in real time or after its completion) to generate content that enables the communication to be productive and facilitates its satisfactory conclusion.

Figure 3:
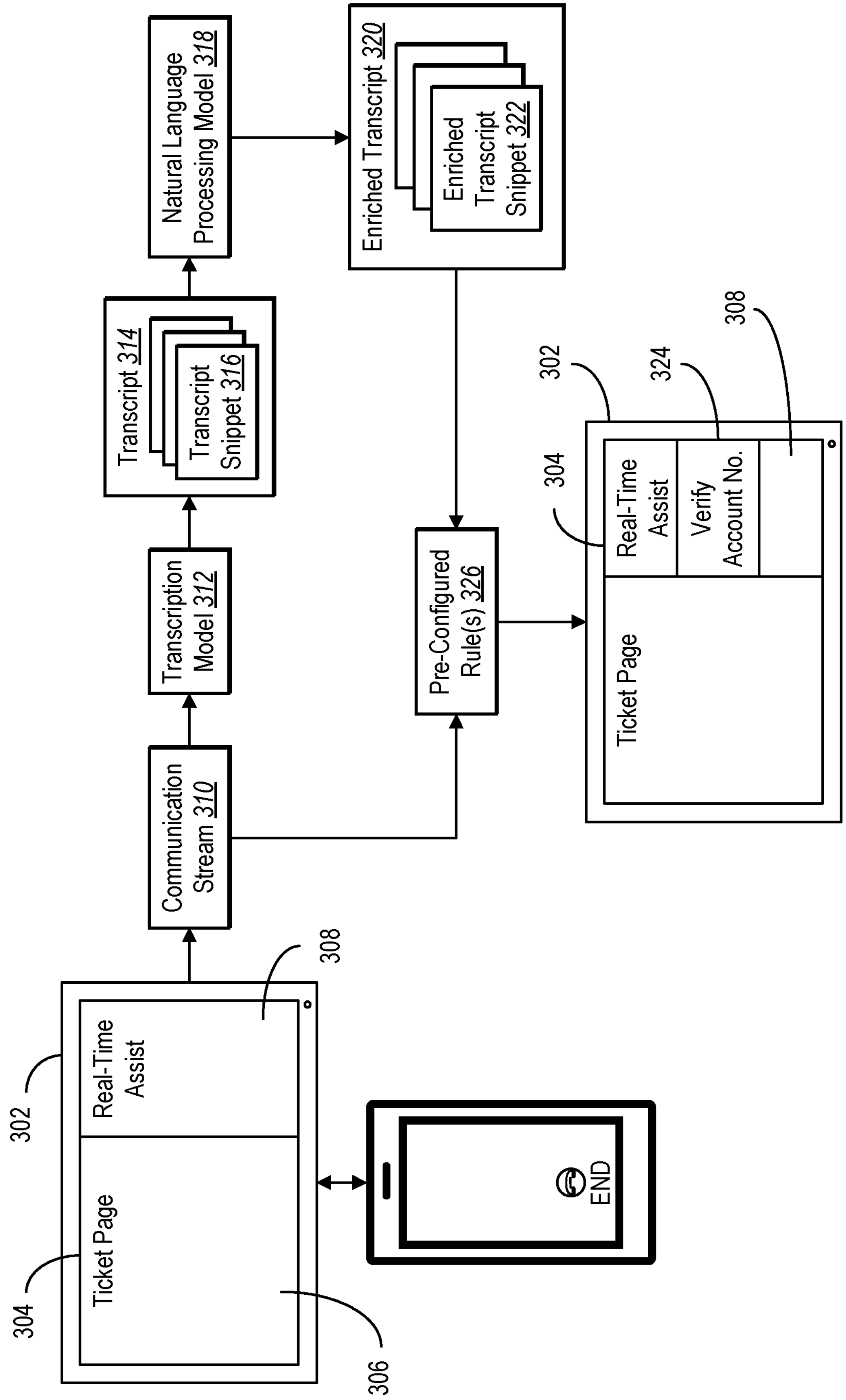
FIG. 3 illustrates the real-time assist system generating and providing a notification during a communication in accordance with one or more embodiments.

As previously mentioned, in one or more embodiments, the real-time assist system 106 operates in real time to facilitate a communication between multiple participants. In particular, the real-time assist system 106 can, during the communication, generate and provide one or more relevant notifications for display by a client device participating in the communication. FIGS. 3-5 illustrate the real-time assist system 106 generating and providing notifications to a participating client device during a communication in accordance with one or more embodiments.

FIG. 3 illustrates the real-time assist system 106 generating and providing a notification during a communication in accordance with one or more embodiments. As shown, the real-time assist system 106 provides a graphical user interface 304 for display on a client device 302. In particular, the client device 302 includes a client device that is participating in a communication. For instance, the client device 302 can be engaged in a communication with at least one other client device, such as through a phone call, video chat, online chat, text messaging, or email.

In one or more embodiments, the real-time assist system 106 provides the graphical user interface 304 for display to assist in the communication. For instance, as shown, the graphical user interface 304 includes a left panel 306 and a right panel 308. In some embodiments, the left panel 306 includes a panel that displays certain information related to the communication. For instance, in some cases, the left panel 306 includes a ticket page that provides information related to a support ticket. Indeed, as previously mentioned, the client device 302 can be associated with a user that is representing an organization, such as an agent that is part of a customer support department of the organization. Thus, in some implementations, the communication includes the discussion of a support ticket for another participant of the communication (e.g., a customer of the organization). As such, the left panel 306 can display information of a previously submitted support ticket or include interactive options for creating a new support ticket. In some instances, the left panel 306 displays other information, such as communication summaries.

In one or more embodiments, the right panel 308 of the graphical user interface 304 includes a real-time assist panel. For instance, in some cases, the real-time assist system 106 uses the right panel 308 to display notifications in real time to facilitate engagement of the user of the client device 302 during the communication. Thus, as will be discussed in more detail below, the real-time assist system 106 can use the right panel 308 to display notifications having prompts, encouragement, or links to digital content items that are relevant to the communication.

As shown in FIG. 3, the real-time assist system 106 receives a communication stream 310 having the contents of the communication from the client device 302. In particular, the real-time assist system 106 receives the communication stream 310 from the client device 302 during the communication. Indeed, the real-time assist system 106 can receive the communication stream 310 in real time as the communication stream 310 is created. Thus, during a live communication (e.g., a phone call, video chat, or online chat), the real-time assist system 106 can receive new data as part of the communication stream 310 that represents the most recent communications (e.g., utterances) of the communication participants.

In some cases, the communication stream 310 is generated at the client device 302 or transmitted through the client device. For instance, in some cases, the client device 302 establishes and maintains a communication channel for the communication; thus, the client device 302 generates the communication stream 310 while the communication channel is maintained. In some instances, however, the client device 302 is connected to one or more other devices (e.g., devices of a dedicated telephone system) that establish and maintain the communication channel; thus, the real-time assist system 106 receives the communication stream 310 from the one or more other devices through the client device 302. In some implementations, the real-time assist system 106 receives the communication stream 310 directly from the one or more other devices.

As further shown in FIG. 3, the real-time assist system 106 uses a transcription model 312 to generate a transcript 314 from the communication stream 310. In particular, the real-time assist system 106 uses the transcription model 312 to generate the transcript 314 to include a textual representation of the contents of the communication based on the communication stream 310. In one or more embodiments, the real-time assist system 106 uses the transcription model 312 to generate the transcript 314 during the communication. Indeed, in some embodiments, the real-time assist system 106 generates the transcript 314 from the communication stream 310 as the communication stream 310 is received.

In one or more embodiments, the transcription model 312 includes a model of the real-time assist system 106. As such, the real-time assist system 106 can utilize the transcription model 312 to generate the transcript 314 itself. In some implementations, however, the transcription model 312 includes a third-party model hosted on a third-party system (e.g., a system implemented by one of the third-party server(s) 114 discussed with reference to FIG. 1). Thus, in some embodiments, the real-time assist system 106 transmits the communication stream 310 over a network to the third-party system hosting the transcription model 312 and receives the transcript 314 back from the third-party system over the network in response.

As shown in FIG. 3, the real-time assist system 106 generates the transcript 314 by generating a plurality of transcript snippets, such as the transcript snippet 316. In particular, the real-time assist system 106 can generate the transcript 314 by generating a plurality of transcript snippets that collectively represent the entirety of the communication.

Indeed, in one or more embodiments, the real-time assist system 106 transcribes portions of the communication stream 310 one at a time by generating a transcript snippet for each portion. For instance, the real-time assist system 106 can transcribe the communication stream 310 in time-based chunks, such as by transcribing the communication stream 310 in thirty-second chunks or one-minute chunks. Thus, when receiving the communication stream 310, the real-time assist system 106 can generate a transcript snippet upon determining that a time threshold designated for the time-based chunks has been reach. As such, each transcript snippet can correspond to a different time-based chunk of the communication stream 310. In some instances, the real-time assist system 106 transcribes the communication stream 310 based on turn-based chunks, such as by transcribing the communication stream 310 based on chunks that correspond to when a participant of the communication begins and ends a turn at communicating. Thus, each transcript snippet can correspond to a portion of the communication associated with a speaker turn in which one participant is communicating without interruption by another participant. In other words, each transcript snippet can represent a segment of the communication that begins and ends with continuous communication from a participant.

As further shown in FIG. 3, the real-time assist system 106 uses a natural language processing model 318 to generate an enriched transcript 320 from the transcript 314. In particular, the real-time assist system 106 generates the enriched transcript 320 by generating a plurality of enriched transcript snippets, such as the enriched transcript snippet 322, from the plurality of transcript snippets generated from the communication stream 310. In one or more embodiments, the real-time assist system 106 uses the natural language processing model 318 to generate the enriched transcript 320 during the communication. For instance, the real-time assist system 106 can use the natural language processing model 318 to generate the enriched transcript 320 upon completion of the transcript 314. More specifically, the real-time assist system 106 can use the natural language processing model 318 to generate an enriched transcript snippet from a transcript snippet upon completion of the transcript snippet.

In one or more embodiments, the real-time assist system 106 generates the enriched transcript 320 from the transcript 314 by using the natural language processing model 318 (or multiple natural processing models) to analyze the transcript 314. Based on the analysis, the real-time assist system 106 can generate contextual information corresponding to the contents of the communication represented within the transcript 314. For instance, based on the analysis, the real-time assist system 106 can generate an indication of a topic, a sentiment, or an emotion associated with the contents of the communication. Thus, the real-time assist system 106 can generate the enriched transcript 320 by incorporating the contextual information. Accordingly, the real-time assist system 106 can generate the enriched transcript 320 to include the textual representations of the contents of the communication that was initially included in the transcript 314 and to further include the contextual information corresponding to the contents.

To illustrate, the real-time assist system 106 can use the transcription model 312 to generate the enriched transcript snippet 322 from the transcript snippet 316. In particular, the real-time assist system 106 can use the transcription model 312 to analyze the transcript snippet 316 and generate one or more pieces of contextual information corresponding to the contents of the communication represented within the transcript snippet 316. Thus, the real-time assist system 106 can generate the enriched transcript snippet 322 to include the textual representation of the segment of the communication represented within the transcript snippet 316 and to further include the one or more pieces of contextual information corresponding to that segment.

Additionally, as shown in FIG. 3, the real-time assist system 106 generates a notification 324 for display within the graphical user interface 304 of the client device 302. In particular, the real-time assist system 106 generates the notification 324 for display within the right panel 308 of the graphical user interface 304. For instance, the real-time assist system 106 can generate and provide the notification 324 for display during the communication. Thus, the real-time assist system 106 can use the notification 324 to facilitate participation of the user of the client device 302 in the communication. FIG. 3 illustrates a particular notification, but the real-time assist system 106 can generate various notifications in various embodiments, which will be discussed further with respect to FIGS. 4A-4D.

As FIG. 3 illustrates, the real-time assist system 106 can generate the notification 324 using the enriched transcript 320. For example, in some embodiments, the real-time assist system 106 generates a notification for each enriched transcript snippet or generates a notification for each enriched transcript snippet associated with a particular communication participant. To illustrate, the real-time assist system 106 can generate a notification for each transcript snippet corresponding to a user that is a customer of the organization represented by the user of the client device 302.

As shown in FIG. 3, however, the real-time assist system 106 can generate the notification 324 based on one or more pre-configured rules 326. For instance, the real-time assist system 106 can use the one or more pre-configured rules 326 to indicate an appropriate time to generate a notification. For example, the real-time assist system 106 can use the one or more pre-configured rules 326 to indicate key moments or occurrences of the communication that qualify for the generation of a notification to avoid overwhelming the user of the client device 302 with too many notifications or to avoid generating notifications that provide little value to the communication.

In one or more embodiments, the real-time assist system 106 uses the one or more pre-configured rules 326 to indicate which content represented in an enriched transcript snippet triggers the generation of a notification (e.g., which utterances qualify as triggering utterances). Further, in some instances, the real-time assist system 106 uses the one or more pre-configured rules 326 to indicate what type of notification is to be generated. In some embodiments, the real-time assist system 106 also uses the one or more pre-configured rules 326 to indicate the content of notification. In some implementations, the real-time assist system 106 uses the one or more pre-configured rules 326 to indicate content represented within an enriched transcript snippet is to be used in generating a notification.

In one or more embodiments, the real-time assist system 106 establishes the one or more pre-configured rules 326 (e.g., as default rules). In some embodiments, the real-time assist system 106 establishes the one or more pre-configured rules 326 based on user input. Indeed, in some cases, the one or more pre-configured rules 326 are configurable to meet the needs of the user of the client device 302 (e.g., to meet the needs of the organization represented by the user). Further, in some implementations, the one or more pre-configured rules 326 are modifiable so that they can be updated based on user input to improve their effectiveness. Pre-configured rules and their operation will be discussed in more detail below with reference to FIGS. 4A-4D.

As further shown in FIG. 3, the real-time assist system 106 can generate the notification 324 without using the enriched transcript 320 in some cases. In particular, in some embodiments, the one or more pre-configured rules 326 indicate an instance in which a notification should be generated that is not represented in the enriched transcript 320 or may otherwise be determined or identified without the use of the enriched transcript 320. For instance, in some embodiments, the one or more pre-configured rules 326 indicate a threshold time at which a notification should be generated. Accordingly, upon determining that the duration of the communication has reached or exceeded the threshold time, the real-time assist system 106 can generate the notification 324 in accordance with the one or more pre-configured rules 326.

Though FIG. 3 illustrates generation of the notification 324 using the enriched transcript 320, the real-time assist system 106 can generate notifications directly based on the transcript 314 generated from the communication stream 310. Indeed, in some cases, generating a notification in accordance with the one or more pre-configured rules 326 can be performed using the transcript 314. For example, where a pre-configured rule indicates an utterance that triggers the generation of a notification, the real-time assist system 106 can generate a notification based on determining that the transcript 314 (e.g., a transcript snippet) includes the triggering utterance.

As previously mentioned, in one or more embodiments, the real-time assist system 106 generates notifications for display by a client device of a user participating in a communication. As further mentioned, the real-time assist system 106 can generate the notifications based on one or more pre-configured rules. FIGS. 4A-4D illustrate the real-time assist system 106 generating notifications based on pre-configured rules in accordance with one or more embodiments.

Figure 4A:
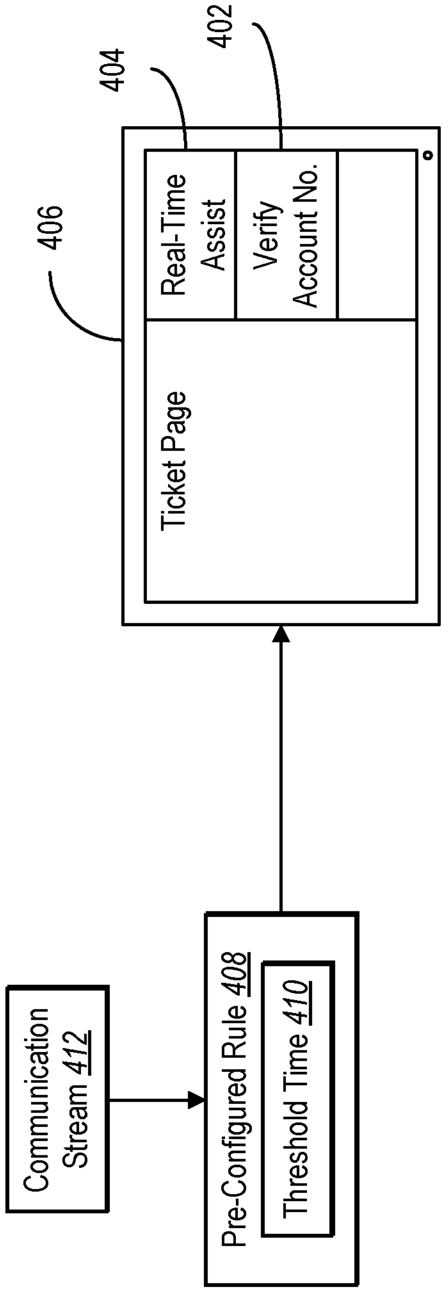
FIGS. 4A-4D illustrates the real-time assist system generating notifications based on pre-configured rules in accordance with one or more embodiments.
Figure 5:
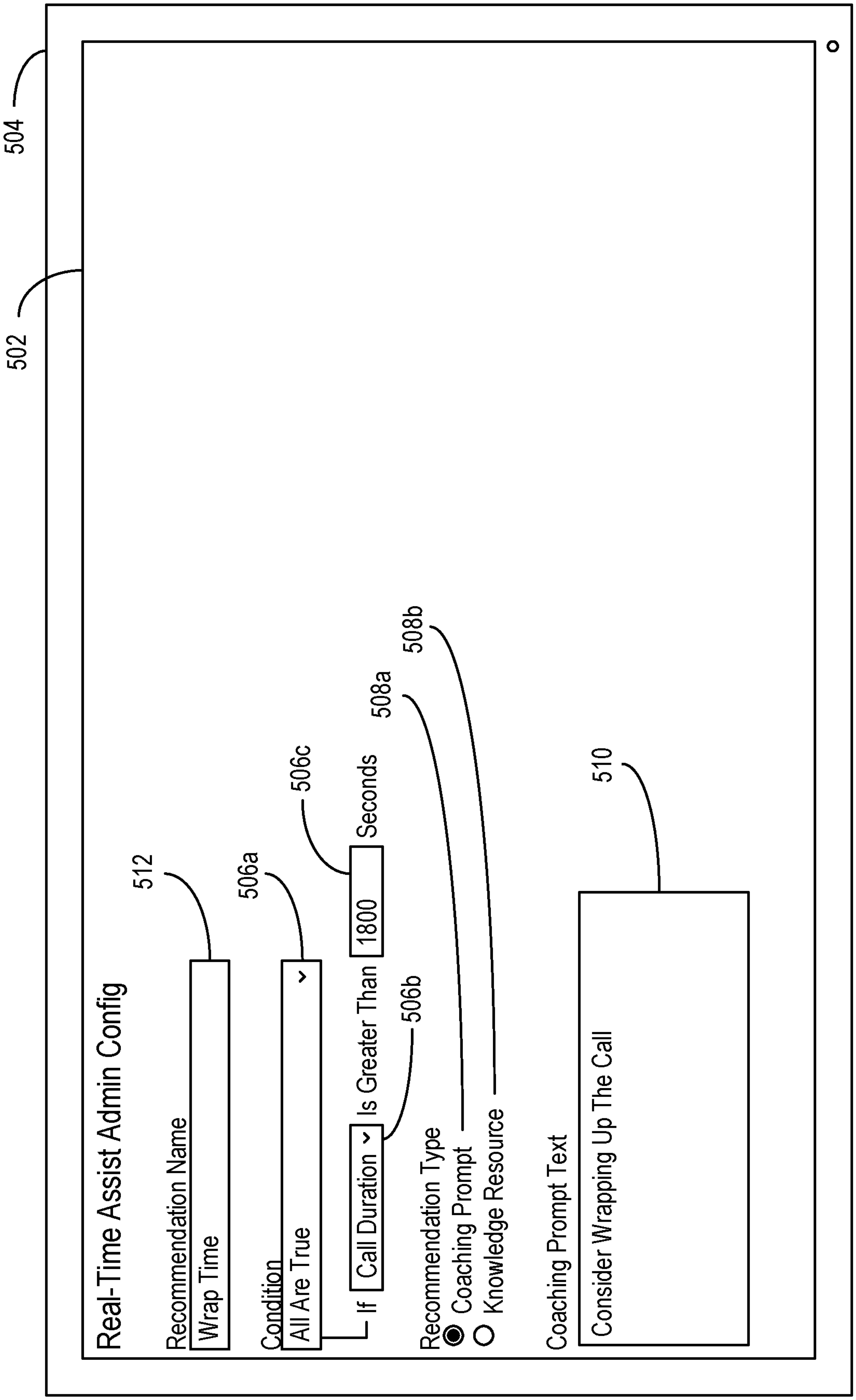
FIG. 5 illustrates a graphical user interface used by the real-time assist system to enable a user to generate a pre-configured for the generation of a notification in accordance with one or more embodiments.

For instance, FIG. 4A illustrates the real-time assist system 106 generating a notification 402 for display within a graphical user interface 404 of a client device 406. In particular, FIG. 4A illustrates the real-time assist system 106 generating the notification 402 based on a pre-configured rule 408 that indicates a threshold time 410 for generating a notification. Indeed, the pre-configured rule 408 can indicate that a notification is to be generated when a duration of the communication reaches or exceeds the threshold time 410.

To illustrate, as shown in FIG. 4A, the notification 402 prompts one or more utterances from the user of the client device 406 as part of the communication. In particular, FIG. 4A shows the notification 402 prompting the user of the client device 406 to verify an account number of another user participating in the communication (e.g., such as by asking for the account number and/or reading the account number back to the other user). Thus, in some cases, the pre-configured rule 408 indicates that a notification prompting the one or more utterances from the user is to be generated upon the duration of the communication reaching or exceeding the threshold time 410.

In some implementations, the real-time assist system 106 uses the pre-configured rule 408 to trigger generation of the notification 402 as a reminder to the user of a protocol required for the communication. Indeed, as mentioned above, the user of the client device 406 can include an agent representing an organization. Further, the organization can establish one or more rules as part of a protocol for the user to communication with other users. Accordingly, the real-time assist system 106 can establish and implement the pre-configured rule 408 to incorporate the protocol of the organization (or a protocol of the user).

As shown in FIG. 4A, to implement the pre-configured rule 408, the real-time assist system 106 monitors a communication stream 412 of the communication between the user of the client device 406 and the other participating user. In particular, the real-time assist system 106 uses the communication stream 412 to monitor a duration of the communication. For instance, the real-time assist system 106 can utilize a counter or timer to keep track of the communication as the communication stream 412 is received. The real-time assist system 106 can determine that, if the communication stream 412 is being received, then the communication is ongoing. Thus, the real-time assist system 106 can monitor the duration of the communication stream 412 to determine the duration of the communication. Based on determining that the duration of the communication stream 412 has reached or exceeded the threshold time 410, the real-time assist system 106 can generate and provide the notification 402 for display.

Figure 4B:
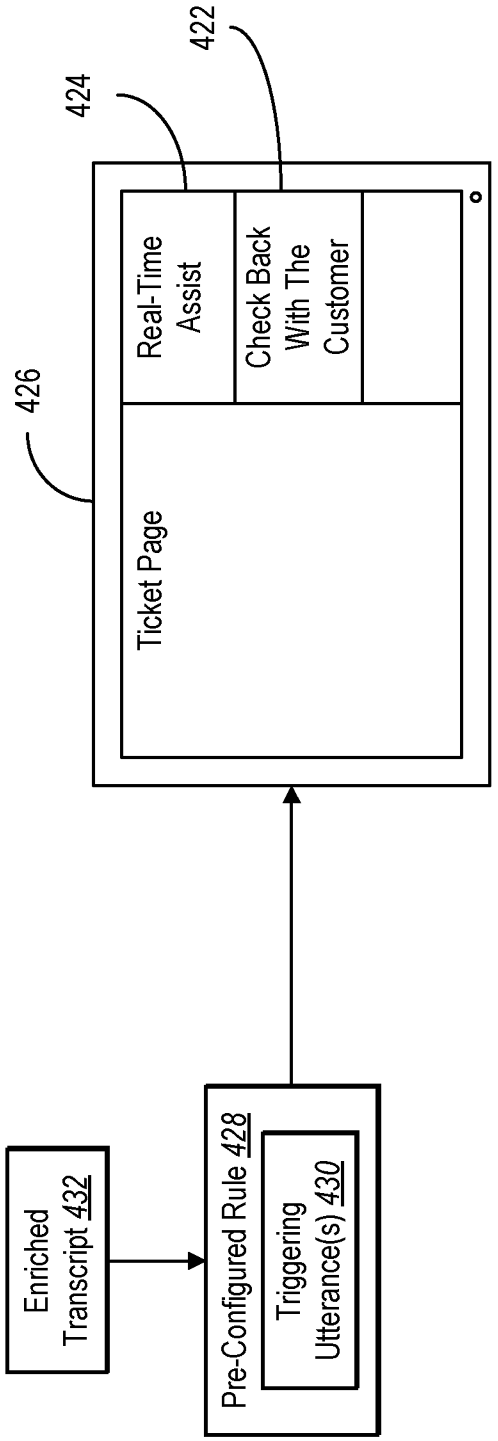

FIG. 4B illustrates the real-time assist system 106 generating a notification 422 for display within a graphical user interface 424 of a client device 426. In particular, FIG. 4B illustrates the real-time assist system 106 generating the notification 422 based on a pre-configured rule 428 that indicates one or more triggering utterances 430 that trigger generation of a notification. Indeed, the pre-configured rule 428 can indicate that a notification is to be generated when a user participating in the communication states (e.g., speaks or writes) the one or more triggering utterances 430.

To illustrate, as shown in FIG. 4B, the notification 422 prompts one or more utterances from the user of the client device 426 as part of the communication. In particular, FIG. 4B shows the notification 422 prompting the user of the client device 426 to check back with another user participating in the communication (e.g., returning to the communication after having left or after having put the other user on hold or mute). Thus, in some cases, the pre-configured rule 428 indicates that a notification prompting the one or more utterances from the user is to be generated upon determining that one of the users participating in the communication (e.g., the user of the client device 426) has stated the one or more triggering utterances 430.

As shown in FIG. 4B, to implement the pre-configured rule 428, the real-time assist system 106 analyzes an enriched transcript 432 (or a transcript) generated for the communication. In particular, the real-time assist system 106 can analyze the enriched transcript 432 to determine the presence of the one or more triggering utterances 430. For instance, the real-time assist system 106 can determine that the textual representation of the contents of the communication included in the enriched transcript 432 contains the one or more triggering utterances 430. Upon determining that the enriched transcript 432 includes the one or more triggering utterances 430, the real-time assist system 106 can generate the notification 422 for display.

To provide an example, as mentioned, the pre-configured rule 428 can indicate generation of a notification to prompt the user of the client device 426 to return to the conversation after having left (e.g., and to announce the return). Thus, in some cases, the one or more triggering utterances 430 can include one or more phrases that indicate that the user of the client device 426 is leaving the conversation or otherwise placing the conversation on pause (e.g., "I will be back in a moment," "I will put you on hold for a moment," "I will mute my microphone for a moment," or some other variation). In some cases, the real-time assist system 106 determines to generate the notification 422 upon determining that at least one of the triggering utterances 430 has been identified in the enriched transcript 432. For instance, in some cases, the one or more triggering utterances 430 include multiple acceptable phrase that can each individually trigger the generation of a notification. In some embodiments, however, the real-time assist system 106 determines to generate the notification 422 upon determining that all the triggering utterances 430 have been identified in the enriched transcript 432.

Though not shown in FIG. 4B, in some implementations, the pre-configured rule 428 further includes a threshold time. For example, in some cases, the real-time assist system

106 uses the pre-configured rule 428 to notify the user of the client device 426 that the communication has been paused for too long or to otherwise remind the user to return to the conversation before it has been paused for too long. Thus, in such embodiments, the real-time assist system 106 can determine to generate the notification 422 upon identifying the one or more triggering utterances 430 within the enriched transcript 432 and upon determining that a threshold time has been reached or exceeded by the duration of the pause in the conversation.

Figure 4C:
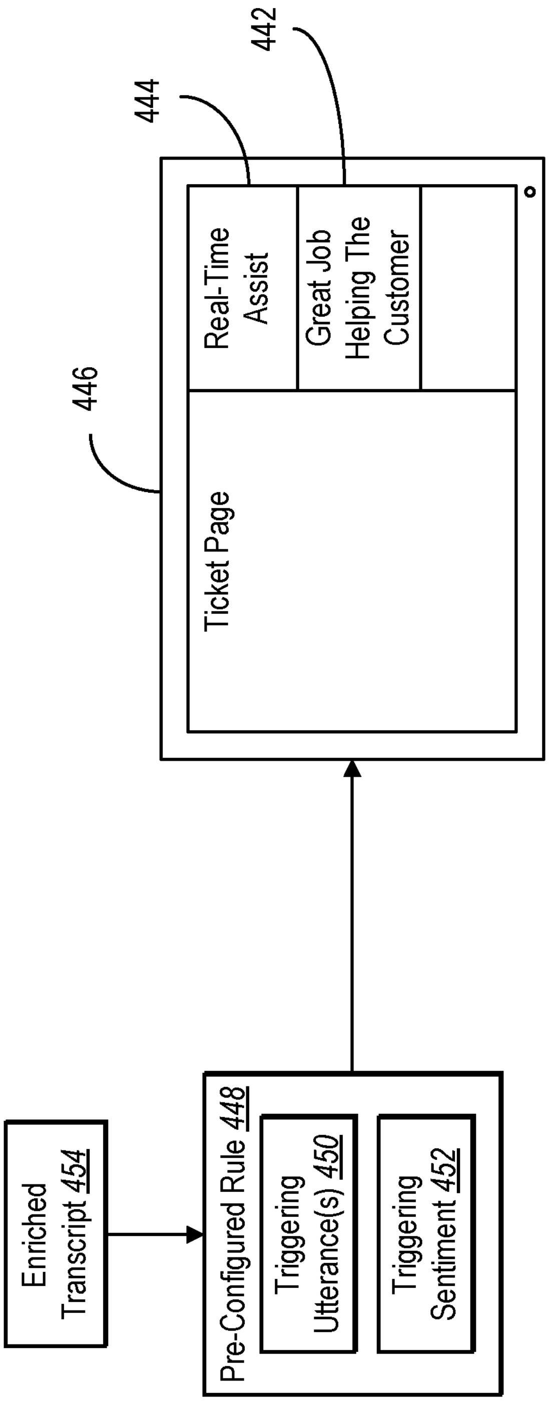

FIG. 4C illustrates the real-time assist system 106 generating a notification 442 for display within a graphical user interface 444 of a client device 446. In particular, FIG. 4C illustrates the real-time assist system 106 generating the notification 442 based on a pre-configured rule 448 that indicates one or more triggering utterances 450 and a triggering sentiment 452 that trigger generation of a notification. Indeed, the pre-configured rule 448 can indicate that a notification is to be generated when a user participating in the communication states (e.g., speaks or writes) the one or more triggering utterances 450 with the triggering sentiment 452.

To illustrate, as shown in FIG. 4C, the notification 442 encourages or affirms the participation of the user of the client device 446 in the communication. In particular, FIG. 4C shows the notification 442 providing a congratulatory statement or affirmation that indicates that the user of the client device 446 performed well during the communication. Thus, in some cases, the pre-configured rule 448 indicates that a notification encouraging or affirming the participation of the user in the communication is to be generated upon determining that one of the users participating in the communication (e.g., the other user participating in the communication) has stated the one or more triggering utterances 450 with the triggering sentiment 452.

To provide an example, the one or more triggering utterances 450 can include an utterance that expressly or implicitly indicates that the other user is appreciative of the user of the client device 446. For instance, the one or more triggering utterances 450 can include an utterance from the user thanking the user of the client device 446 or expressing that a concern of the other user has been resolved satisfactorily. Further, the triggering sentiment 452 can include a sentiment that indicates that the other user that is providing the one or more triggering utterances 450 is doing so sincerely, joyfully, or otherwise without sarcasm.

Thus, in one or more embodiments, the real-time assist system 106 utilizes the pre-configured rule 448 to generate notifications that reinforce positive performance during a communication. In some cases, the real-time assist system 106 utilizes the pre-configured rule 448 to generate notifications that reinforce previous training. For instance, in some embodiments, the real-time assist system 106 uses the pre-configured rule 448 to trigger generation of a notification that acknowledges that the user of the client device 446 has followed previously provided training instructions during a communication (e.g., the user performed a particular action or communicated with the other user in a particular way that is prescribed by the training).

As shown in FIG. 4C, to implement the pre-configured rule 448, the real-time assist system 106 analyzes an enriched transcript 454 generated for the communication. In particular, the real-time assist system 106 can analyze the enriched transcript 454 to determine the presence of the one or more triggering utterances 450 and the triggering sentiment 452. For instance, the real-time assist system 106 can determine that the textual representation of the contents of the communication included in the triggering sentiment 452 contains the one or more one or more triggering utterances 450. The real-time assist system 106 can further determine that the contextual information associated with the one or more triggering utterances 450 in the enriched transcript 454 includes the triggering sentiment 452. In other words, the real-time assist system 106 uses the enriched transcript 454 to determine that the one or more triggering utterances 450 were stated with the triggering sentiment 452. Upon determining the presence of the one or more triggering utterances 450 and that the triggering sentiment 452 is also present within the enriched transcript 454 and is associated with the one or more triggering utterances 450, the real-time assist system 106 can generate the notification 442 for display.

Figure 4D:
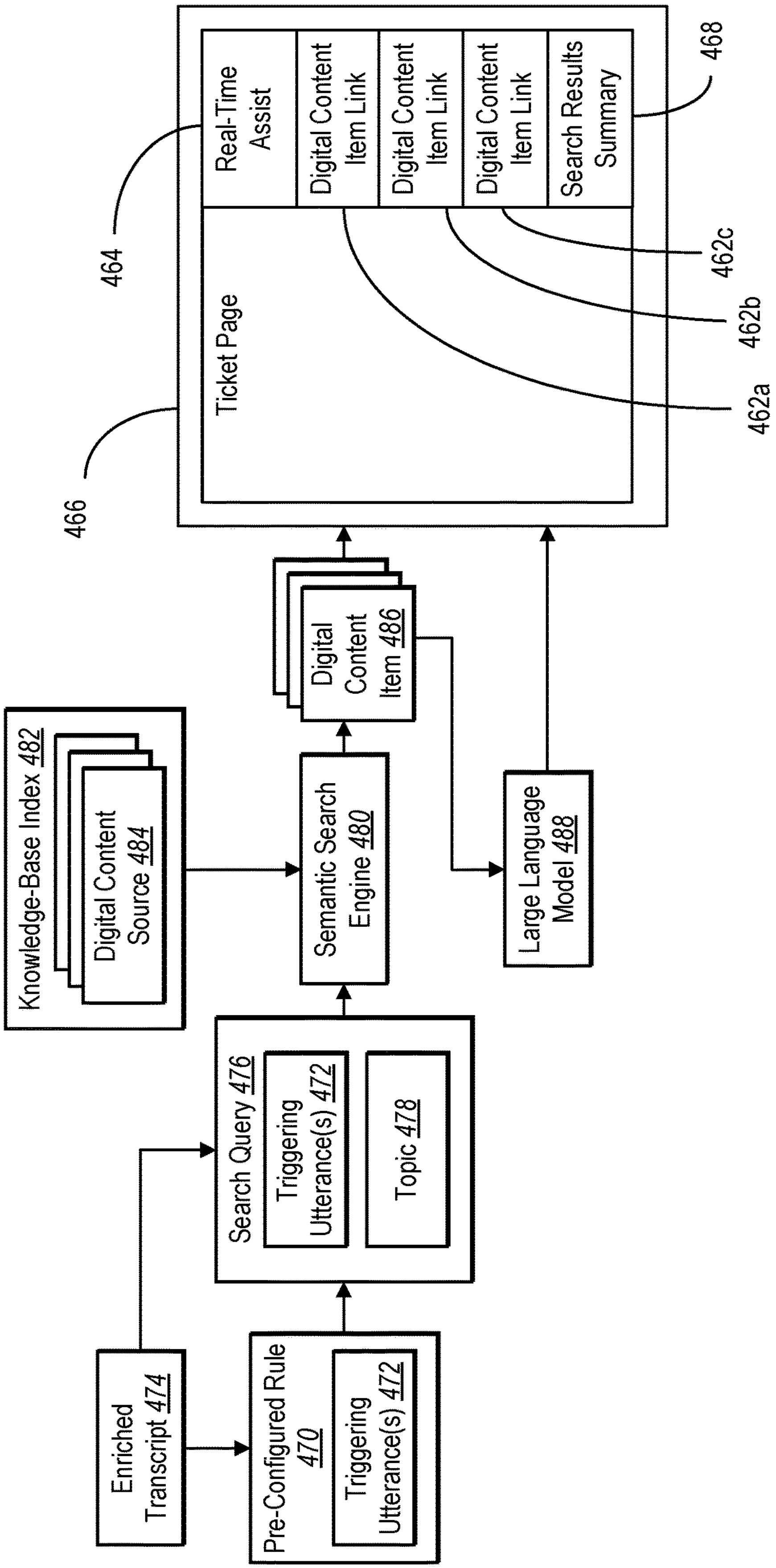

FIG. 4D illustrates the real-time assist system 106 generating notifications 462*a*-462*c* for display within a graphical user interface 464 of a client device 466. FIG. 4D also illustrates the real-time assist system 106 generating a notification summary 468 for display within the graphical user interface 464. As shown, the real-time assist system 106 generates the notifications 462*a*-462*c* and the notification summary 468 based on a pre-configured rule 470 that indicates one or more triggering utterances 472. Indeed, the pre-configured rule 470 can indicate that one or more notifications and a notification summary is to be generated when a user participating in the communication states (e.g., speaks or writes) the one or more triggering utterances 472. In some embodiments, the pre-configured rule 470 only indicates that one or more notifications are to be generated (i.e., no notification summary). Further, in some embodiments, the pre-configured rule 470 indicates a number of notifications or a number range of notifications that are to be generated. Accordingly, the real-time assist system 106 can generate one notification or a plurality of notifications in various embodiments. Further, the real-time assist system 106 can generate one or more notifications with a notification summary or generate the notification(s) without the notification summary in various embodiments.

As illustrated in FIG. 4D, the notifications 462*a*-462*c* and the notification summary 468 correspond to the results of a search conducted by the real-time assist system 106. In particular, each of the notifications 462*a*-462*c* includes a link to a digital content item retrieved in response to a search conducted by the real-time assist system 106. Further, the notification summary 468 includes a summary of one or more of the digital content items associated with notifications 462*a*-462*c*. Thus, in one or more embodiments, the real-time assist system 106 conducts a search in accordance with the pre-configured rule 470.

To illustrate, as shown in FIG. 4D, the real-time assist system 106 analyzes an enriched transcript 474 generated for the communication. In particular, the real-time assist system 106 analyzes the enriched transcript 474 to identify one or more of the triggering utterances 472 associated with the pre-configured rule 470. In one or more embodiments, the one or more triggering utterances 472 can include an utterance corresponding to a question that might be asked during a conversation, such as a question for a particular set of information. In some cases, the one or more triggering utterances 472 includes an utterance that indicates an intent to retrieve a particular set of information (e.g., "I will look that up" or "Let me check into that") or an utterance that indicates that certain information is not known (e.g., "I don't know" or "I'm not entirely sure"). In some embodiments, the one or more triggering utterances 472 more generally includes an utterance that references a particular subject matter. For instance, where the user of the client device 466 is an agent for an organization, the one or more triggering utterances 472 can include an utterance that references a product or service sold by the organization, information about the organization itself, or information about other topics with which the organization is associated.

As further shown in FIG. 4D, upon determining that the enriched transcript 474 includes the one or more triggering utterances 472, the real-time assist system 106 generates a search query 476 for conducting a search. Indeed, the real-time assist system 106 can generate the search query 476 to retrieve information that is relevant to the one or more triggering utterances 472. For instance, the real-time assist system 106 can generate the search query 476 to retrieve one or more digital content items that answer a question that was asked, provide information that is not already known, or otherwise provide information regarding a particular subject matter.

As shown in FIG. 4D, the search query 476 includes the one or more triggering utterances 472 and a topic 478. In particular, the topic 478 includes a topic associated with the one or more triggering utterances 472. Indeed, in one or more embodiments, the real-time assist system 106 uses the enriched transcript 474 to identify the topic that is associated with the one or more triggering utterances 472 (e.g., as determined when generated the contextual information for the search query 476). In some cases, the search query 476 includes the one or more triggering utterances 472 but not the topic 478 or only includes the topic 478.

As further shown, the real-time assist system 106 provides the search query 476 to a semantic search engine 480 for conducting a search for relevant information. The real-time assist system 106 uses the semantic search engine 480 to search through a knowledge-based index 482. As shown, the knowledge-based index 482 indexes a plurality of digital content sources, such as the digital content source 484, which each host a plurality of digital content items. Thus, the real-time assist system 106 can use the semantic search engine 480 to search through the digital content sources and retrieves one or more digital content items, such as the digital content item 486, in accordance with the search query 476.

In one or more embodiments, the real-time assist system 106 searches through the digital content sources of the knowledge-based index 482 based on a prioritization of the digital content sources. For instances, in some cases, the real-time assist system 106 searches a first digital content source for one or more digital content items based on the search query 476 and then search a second digital content source and then through a third digital content source and so forth. In some instances, the real-time assist system 106 searches through the digital content sources until the requisite number of digital content items have been retrieved.

In some embodiments, the real-time assist system 106 bases a prioritization of the digital content sources on the search query 476. For instance, the real-time assist system 106 can determine that, based on the search query 476 (e.g., based on the one or more triggering utterances 472 and/or the topic 478), relevant digital content items are more likely to be found in a first digital content source compared to a second digital content source. For example, the real-time assist system 106 can determine that the first digital content source typically includes digital content items that are of a particular topic. Accordingly, the real-time assist system 106 can search through the first digital content source before searching through the second digital content source. In some instances, the real-time assist system 106 bases the prioritization on user input.

As illustrated, the real-time assist system 106 uses the digital content items retrieved from the knowledge-based index 482 to generate the notifications 462*a*-462*c*. In particular, the real-time assist system 106 generates a notification per digital content item retrieved. In some cases, the real-time assist system 106 generates a notification to include a link to the corresponding digital content item. Thus, upon selection of a link via the graphical user interface 464, the real-time assist system 106 can provide the corresponding digital content item for display. Further, the real-time assist system 106 can provide one or more options that enable the client device 466 to transmit a link to other participants of the communication.

As further illustrated, the real-time assist system 106 can further use a large language model 488 to generate the notification summary 468 from the digital content items retrieved from the knowledge-based index 482. For instance, the real-time assist system 106 can provide the digital content items to the large language model 488 as a prompt and use the large language model 488 to generate the notification summary 468 in response. In one or more embodiments, the large language model 488 includes a model of the real-time assist system 106; thus, the real-time assist system 106 can use the large language model 488 to generate the notification summary 468 itself. In some instances, however, the large language model 488 is hosted on a third-party system (e.g., a system implemented by one of the third-party server(s) 114 discussed with reference to FIG. 1). Thus, in some embodiments, the real-time assist system 106 transmits the digital content items (or a link) over a network to the third-party system hosting the large language model 488 and receives the notification summary 468 back from the third-party system over the network in response.

In some embodiments, though not shown in FIG. 4D, the real-time assist system 106 further provides one or more interactive elements for providing feedback with respect to the notifications 462*a*-462*c* that have been provided (i.e., the digital content items associated with the notifications 462*a*-462*c*). For instance, in some cases, the real-time assist system 106 provides at least one interactive element for indicating that the notifications 462*a*-462*c* were helpful during the communication and at least one interactive element for indicating that the notifications 462*a*-462*c* were not helpful. In some implementations, the real-time assist system 106 provides separate interactive elements for each notification to indicate that the particular notification was helpful or unhelpful. Thus, in one or more embodiments, the real-time assist system 106 receives feedback via interactions with the graphical user interface 464.

In some cases, the real-time assist system 106 uses the feedback to improve the retrieval of digital content items in future communications. For instance, in some embodiments, the real-time assist system 106 uses the feedback to modify how the semantic search engine 480 determines which digital content items are relevant to a search query. For example, the real-time assist system 106 can use the feedback to filter or boost certain digital content items so that they are less likely or more likely, respectively, to be selected based on the received feedback. In some instances, the real-time assist system 106 uses the feedback to modify the parameters of the semantic search engine 480.

In some implementations, the real-time assist system 106 also provides interactive elements that enable the participant of the communication interacting with the real-time assist system 106 to perform actions in addition to those directly related to topics discussed during the communication. For example, where the communication participant interacting with the real-time assist system 106 is an agent of an organization (e.g., a customer service representative), the real-time assist system 106 can provide one or more interactive options that enable the communication participant to perform actions that rectify a bad customer service experience or that show appreciation for the other communication participant (e.g., the customer). To illustrate, the real-time assist system can provide one or more interactive elements for providing discounts, coupons, or free subscriptions to a product or service offered by the organization.

In one or more embodiments, the real-time assist system 106 provides interactive elements to perform these additional actions via integration with the internal systems of the organization. For instance, an organization may include one or more internal systems that enable certain actions to be performed by its agents. These internal systems may include application programming interfaces (APIs) that enable communication with external systems. Thus, in some instances, the real-time assist system 106 communicates with these APIs to enable performance of certain actions during the communication.

Though the above discusses providing notifications during a communication, in some implementations, the real-time assist system 106 generates and provides notifications to a communication participant, such as an agent of an organization, before the communication. Indeed, the real-time assist system 106 can generate and provide one or more notifications that assist the agent in preparing for the communication (e.g., after the customer has initiated a phone call or text chat but before the agent of the organization has begun to engage). For instance, in some cases, the real-time assist system 106 maintains data about the customer (e.g., customer profile information, whether the customer has reached out in the past to resolve the same or a different issue, or what actions the customer has already performed in an attempt to resolve the issue to be discussed). Indeed, in some cases, the data maintained by the real-time assist system 106 includes experience-based data, and the real-time assist system 106 can use the data to generate notifications that provide general information about the customer or that updates the agent as to prior activity that may be related to the communication. In one or more embodiments, the data maintained by the real-time assist system 106 includes omnichannel data (e.g., data retrieved from various modes of communication, such as phone, email, or chat).

In addition to maintaining customer data to prepare the agent for an upcoming communication, the real-time assist system can also maintain customer data for use during the communication. In some cases, the data maintained by the real-time assist system 106 includes an aggregation of the data (e.g., omnichannel data) from multiple customers. For instance, the real-time assist system 106 can aggregate the omnichannel data collected with respect to all customers of an organization (or a subset of the customers). Thus, the aggregation can provide a broad or exhaustive view of customer information, such as information related to customer experiences with the organization. For example, the aggregation of data can represent recurring issues experienced by many of the organization's customers. Further, the aggregation can represent actions performed (e.g., by agents of the organization) to resolve those issues and/or indicate which actions were successful. As such, the real-time assist system 106 can use the aggregated data to recommend (e.g., either before or during the communication) actions that have a higher likelihood of success in the context of the communication. Indeed, the real-time assist system 106 can use the aggregated data to identify best practices and recommend those best practices that are relevant to the subject of the communication.

Though FIGS. 4A-4D illustrate a particular set of notifications generated by the real-time assist system 106 based on a particular set of pre-configured rules, it should be understood that these notifications and pre-configured rules are merely illustrative. The real-time assist system 106 can generate various notifications based on various pre-configured rules in various embodiments. In at least one example not shown in FIGS. 4A-4D, the real-time assist system 106 can generate a notification that indicates an action item a user of a client device is to perform either during or after the communication (e.g., based on the user indicating, during the communication, that the action item will be performed). Indeed, in some embodiments, the real-time assist system 106 enables a user to configure rules (i.e., generate pre-configured rules) that can be triggered during communications for the generation of corresponding notifications. FIG. 5 illustrates a graphical user interface used by the real-time assist system 106 to enable a user to generate a pre-configured for the generation of a notification in accordance with one or more embodiments.

Indeed, as shown in FIG. 5, the real-time assist system 106 provides a graphical user interface 502 for display by a client device 504. Further, the real-time assist system 106 provides a plurality of interactive options for generating a pre-configured rule. For instance, the real-time assist system 106 provides an interactive option 512 for creating a label for a pre-configured rule. Thus, where multiple pre-configured rules have been created, the real-time assist system 106 facilitates quick identification of a particular rule, such as in a scenario where a user intends to modify or view the contents of a pre-configured rule.

As further shown, the real-time assist system 106 provides interactive options 506*a*-506*c* for establishing the conditions of the pre-configured rule. Through the interactive option 506*a*, the real-time assist system 106 establishes whether all conditions must be met or only a subset of the conditions need to be met to trigger the pre-configured rule. Further, through the interactive options 506*b*-506*c*, the real-time assist system 106 establishes the conditions themselves. The interactive options 506*a*-506*c* shown in FIG. 5 are illustrative; the real-time assist system 106 can provide various options for establishing the conditions of a pre-configured rule in various embodiments.

Additionally, as shown, the real-time assist system 106 provides interactive options 508*a*-508*b* for establishing the type of notification that is to be generated when the pre-configured rule is triggered, as well as an interactive option 510 for indicating the contents of the notification that is generated. In some embodiments, provision of the interactive option 510 depends on which of the interactive options 508*a*-508*b* are selected. For instance, in some cases, the real-time assist system 106 does not require a user to enter the contents for a "knowledge resource" notification (e.g., where a search for relevant digital content items is conducted). In contrast, as shown, the real-time assist system 106 can require a user to submit contents for a coaching prompt (e.g., where the notification prompts one or more utterances or other action from a communication participant).

By generating and providing notifications during a communication, the real-time assist system 106 operates with improved flexibility when compared to conventional systems. Indeed, the real-time assist system 106 offers an expanded set of real time functionality to improve the effectiveness of a user's participation in the communication. Further, by generating notifications as described above based on a real-time analysis of the contents and contextual information of a communication, the real-time assist system 106 more fully integrates the functionality of computing devices within the communication environment. Indeed, rather than being a supplemental device that only responds to manual user input, the real-time assist system 106 enables a computing device to become an active participant in the communication.

Further, the real-time assist system 106 operates more efficiently by reducing the user interactions typically required by a conventional system to perform the same functions. Indeed, the real-time assist system 106 performs various behind-the-scenes operations to produce the same output that would normally require multiple user interactions with a client device.

As mentioned, various other options can be provided in various embodiments. For instance, in some cases, the real-time assist system 106 provides one or more interactive options for selecting triggering utterances (and their variants) or triggering sentiments for a pre-configured rule. Further, in some cases, the real-time assist system 106 provides additional interactive options for combining pre-configured rules to create additional pre-configured rules (e.g., indicating that a notification is generated based on multiple pre-configured rules). Thus, the real-time assist system 106 can enable a user to create a variety of pre-configured rules.

Figure 6:
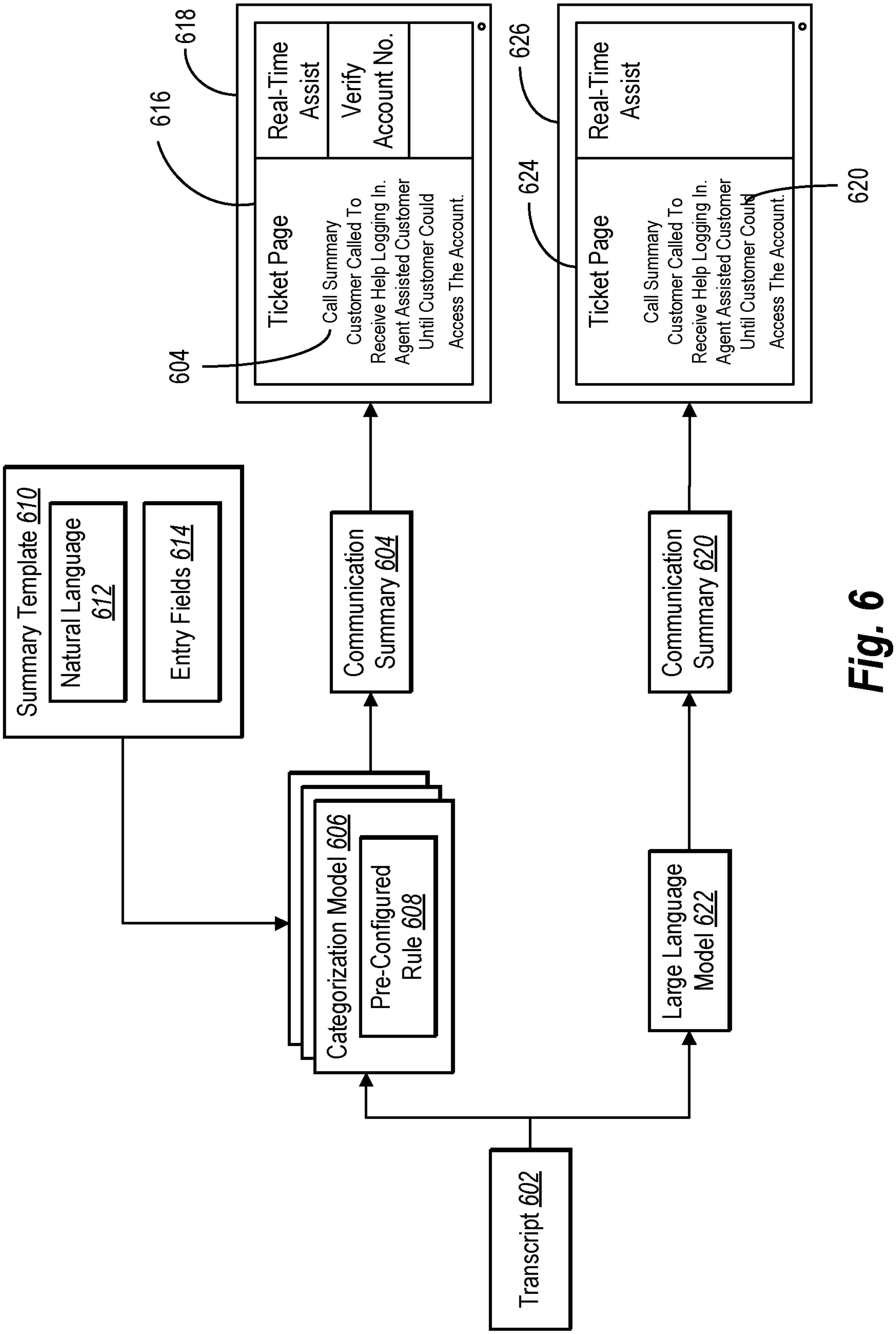
FIG. 6 illustrates the real-time assist system generating a communication summary for a communication in accordance with one or more embodiments.
Figure 7:
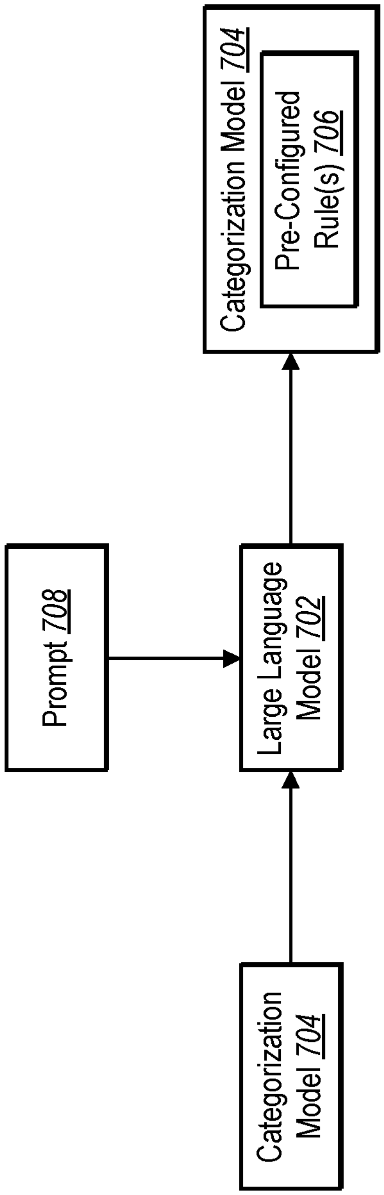
FIG. 7 illustrates the real-time assist system generating a pre-configured rule for a categorization model using a large language model in accordance with one or more embodiments.
Figure 8:
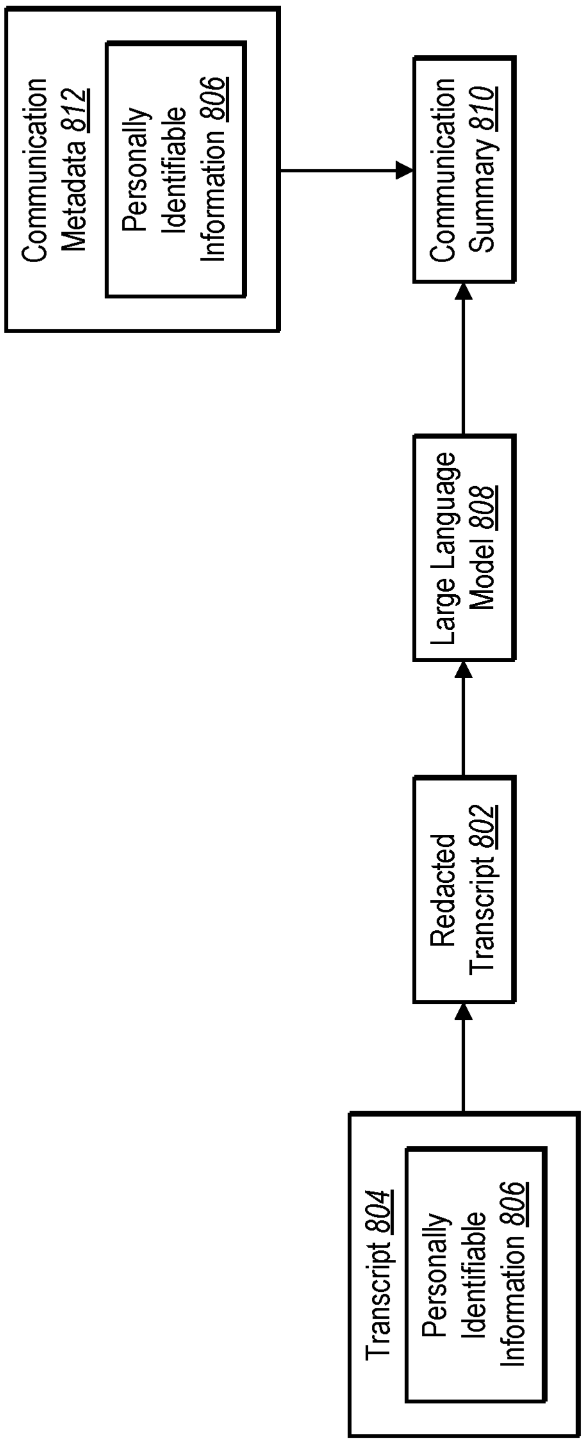
FIG. 8 illustrates the real-time assist system generating a communication summary from a redacted transcript in accordance with one or more embodiments.

As mentioned above, in some embodiments, the real-time assist system 106 can operate to provide assistance with a communication after the communication has ended. For instance, the real-time assist system 106 can generate a communication summary for a communication. FIGS. 6-8 illustrate features of the real-time assist system 106 for generating a communication summary for a communication in accordance with one or more embodiments.

In particular, FIG. 6 illustrates the real-time assist system 106 generating a communication summary for a communication in accordance with one or more embodiments. As shown, the real-time assist system 106 generates the communication summary using a transcript 602 for the summary. In one or more embodiments, the transcript 602 includes the complete transcript for the communication. In other words, the real-time assist system 106 can use the transcript 602 that results from the entire communication for generating the communication summary. In some cases, the real-time assist system 106 generates the transcript 602 by combining (e.g., during or after the communication) the transcript snippets that were generated during the communication. In some cases, the transcript 602 includes an enriched transcript.

As further shown, the real-time assist system 106 can generate a communication summary in at least one of two ways. For instance, the real-time assist system 106 can generate a communication summary 604 based on the transcript 602 using one or more categorization models, such as the categorization model 606. As shown, the categorization models include pre-configured rules, (e.g., the pre-configured rule 608 of the categorization model). In one or more embodiments, a pre-configured rule of a categorization model includes a rule for extracting or deriving information from a transcript for inclusion in a communication summary. For instance, a pre-configured rule can indicate key words, phrases, sentiments, emotions, or topics that are to be included within a communication summary. As one example, a pre-configured rule can indicate a communication reason (e.g., a reason for the call), an action item, or a topic to be included in a communication summary. Thus, the real-time assist system 106 can extract certain information to be included in the communication summary 604 from the transcript 602 or generate certain information for the communication summary 604 based on the information in the transcript 602 in accordance with a pre-configured rule.

As mentioned, the real-time assist system 106 can use a plurality of categorization models to generate the communication summary 604. In some cases, the real-time assist system 106 uses each categorization model to extract or generate a particular piece of information based on the transcript 602. For example, the real-time assist system 106 can use a first categorization model to determine a communication reason, a second categorization model to determine an action item, and a third categorization model to determine a topic for the communication summary 604. In other words, in some cases, the first categorization model includes a first pre-configured rule for determining a communication reason, the second categorization model includes a second pre-configured rule for determining an action item, and the third categorization model includes a third pre-configured rule for determining a topic.

In one or more embodiments, the real-time assist system 106 provides default pre-configured rules or generates the pre-configured rules based on user input. In some cases, as will be discussed more below, the real-time assist system 106 uses a generative model to generate the pre-configured rules.

As further shown in FIG. 6, the real-time assist system 106 generates the communication summary 604 from a summary template 610. As shown, the summary template 610 includes natural language 612 and entry fields 614. In some cases, the entry fields 614 correspond to the natural language 612. For instance, the natural language 612 can include natural language segments that each describe the contents to be entered into one of the entry fields 614. Though not shown, the summary template 610 can further include a content structure in some instances. For example, the natural language 612 and the entry fields 614 can be organized in a manner that provides a structure to the content of the communication summaries generated using the summary template 610. Thus, when generating the communication summary 604, the real-time assist system 106 can use the content structure provided by the summary template 610.

In one or more embodiments, the real-time assist system 106 generates the summary template 610 for use in generating communication summaries. For instance, the real-time assist system 106 can generate the natural language 612, the entry fields 614, and/or the content structure. In some cases, the real-time assist system 106 uses generative model, such as a large language model to generate the natural language 612. In some instances, the real-time assist system 106 generates the natural language 612 based on user input.

In one or more embodiments, the real-time assist system 106 uses the categorization models to generate content entries for the entry fields 614 of the summary template 610. In particular, the real-time assist system 106 can utilize each categorization model to generate a content entry for a different entry field. Thus, in some cases, the real-time assist system 106 maps the output of each categorization model to a different entry field of the summary template 610. Accordingly, the real-time assist system 106 can use a categorization model to analyze the transcript 602, generate a content entry as output based on the analysis, and generate the communication summary 604 by including the content entry within the appropriate entry field.

As shown, in FIG. 6, the real-time assist system 106 can provide the communication summary 604 for display within a graphical user interface 616 of a client device 618 (e.g., a client device participating in the communication). In one or more embodiments, the real-time assist system 106 can modify the communication summary 604 within the graphical user interface 616 based on receiving user input. Further, in some cases, the real-time assist system 106 can transmit or store the communication summary 604 based on user input or default settings.

As further shown in FIG. 6, the real-time assist system 106 can generate a communication summary 620 based on the transcript 602 using a large language model 622. For instance, the real-time assist system 106 can provide the transcript 602 to the large language model 622 as a prompt and use the large language model 622 to generate the communication summary 620 in response to the prompt. In one or more embodiments, the real-time assist system 106 pre-trains the large language model 622 to ensure that the communication summary 620 includes certain information. In particular, the real-time assist system 106 can train the large language model 622 by updating its model parameters via a training phase in addition to the initial training phase of the large language model 622.

As illustrated, the real-time assist system 106 can provide the communication summary 620 for display within a graphical user interface 624 of a client device 626 (e.g., a client device participating in the communication). In one more embodiments, the real-time assist system 106 can modify the communication summary 620 within the graphical user interface 624 based on receiving user input. Further, in some cases, the real-time assist system 106 can transmit or store the communication summary 620 based on user input or default settings.

As mentioned, the real-time assist system 106 can generate communication summaries using means different than those explicitly shown in FIG. 6. For instance, in some cases, the real-time assist system 106 uses both categorization models and a large language model to generate a communication summary from a transcript. For instance, the real-time assist system 106 can use the categorization models (and a summary template) to generate a first portion of the communication summary and use the large language model to generate a second portion of the communication summary. Accordingly, the real-time assist system 106 can generate the completed communication summary by combining the portions generated using the different models.

As previously mentioned, the real-time assist system 106 can generate pre-configured rules for categorization models based on user input. In some embodiments, however, the real-time assist system 106 generates a pre-configured rule for a categorization model using a large language model. FIG. 7 illustrates the real-time assist system 106 generating a pre-configured rule for a categorization model using a large language model in accordance with one or more embodiments.

Indeed, as shown in FIG. 7, the real-time assist system 106 uses a large language model 702 to generate a pre-configured rule 706 for a categorization model 704 based on a prompt 708. In one or more embodiments, the prompt 708 includes a prompt for generating the pre-configured rule 706 to cover particular subject matter. For instance, the prompt 708 can include a prompt to generate the pre-configured rule 706 to enable the categorization model 704 to determine a topic from a transcript (e.g., extract the topic from an enriched transcript or generate a topic based on the contents of a transcript or enriched transcript) and include the topic within the corresponding communication summary. In one or more embodiments, the prompt 708 includes natural language generated via user input or some other document.

In one or more embodiments, the real-time assist system 106 trains the large language model 702 to generate pre-configured rules for categorization models. For instance, the real-time assist system 106 can use training data, such as training rules and corresponding training prompts, and updates the parameters of the large language model 702 based on its predictive performance. In particular, the real-time assist system 106 can train the large language model 702 by updating its model parameters via a training phase in addition to the initial training phase of the large language model 702.

FIG. 8 illustrates the real-time assist system 106 generating a communication summary from a redacted transcript in accordance with one or more embodiments. Indeed, as shown in FIG. 8, the real-time assist system 106 generates a redacted transcript 802 from a transcript 804. In particular, as shown, the transcript 804 includes personally identifiable information 806. The personally identifiable information 806 can include information for one or more of the users participating in the communication. Thus, as shown, the real-time assist system 106 can generate the redacted transcript 802 by redacting the personally identifiable information 806 from the transcript 804.

As further illustrated, the real-time assist system 106 provides the redacted transcript 802 to a large language model 808 and uses the large language model 808 to generate a communication summary 810. Indeed, as previously mentioned, the real-time assist system 106 uses a large language model hosted on a third-party system in some instances. Accordingly, to prevent the exposure of the personally identifiable information 806 to external systems, the real-time assist system 106 can provide the redacted transcript 802, which does not include the personally identifiable information 806, to the large language model 808.

As further shown in FIG. 8, the real-time assist system 106 uses communication metadata 812 in generating the communication summary 810. As illustrated, the communication metadata 812 includes the personally identifiable information 806. Indeed, while the real-time assist system 106 removes the personally identifiable information 806 from the transcript 804 to prevent exposure to the large language model 808, the real-time assist system 106 can use the communication metadata 812 to include the personally identifiable information 806 within the communication summary 810. Thus, the real-time assist system 106 can prevent exposure of the personally identifiable information 806 to external systems while including it within the communication summary 810.

In some cases, the real-time assist system 106 includes other data from the communication metadata 812 within the communication summary 810. For instance, the real-time assist system 106 can include the date, time of day, or duration of the communication.

By automatically generating communication summaries, the real-time assist system 106 offers improved efficiency when compared to conventional systems. For instance, while conventional systems may require a participant of a communication to manually create a summary, the real-time assist system 106 performs that function behind-the-scenes. Accordingly, the real-time assist system 106 reduces the user interactions typically required by conventional systems in producing a communication summary.

In one or more embodiments, the real-time assist system 106 further offers one or more interactive elements for receiving feedback regarding the effectiveness of the assistance provided during the communication. For instance, as previously mentioned, the real-time assist system 106 can provide one or more interactive elements for indicating if digital content items retrieved and provided during the communication were helpful or unhelpful. Further, the real-time assist system 106 can use interactive elements to receive feedback regarding other notifications provided during a communication (e.g., time-based notifications or utterance-based notifications) or the communication summary generated after the communication. Thus, the real-time assist system 106 can receive feedback based on user interactions with the interactive elements.

To illustrate, in one or more embodiments, the real-time assist system 106 provides an end-of-call survey after a communication has ended. The end-of-call survey can include various interactive elements for providing feedback regarding the assistance that was given during and/or after the communication. In at least one example, the end-of-call survey includes an interactive element for indicating whether there were digital content items available that would have been more relevant to the communication than those that were actually retrieved in response to a search query or whether there were more relevant sources that could have been searched.

In some embodiments, the real-time assist system 106 uses the feedback to improve its performance for future communications. For instance, the real-time assist system 106 can use the received feedback to re-train the models that are employed in generating the notifications and/or the communication summary.

Figure 9:
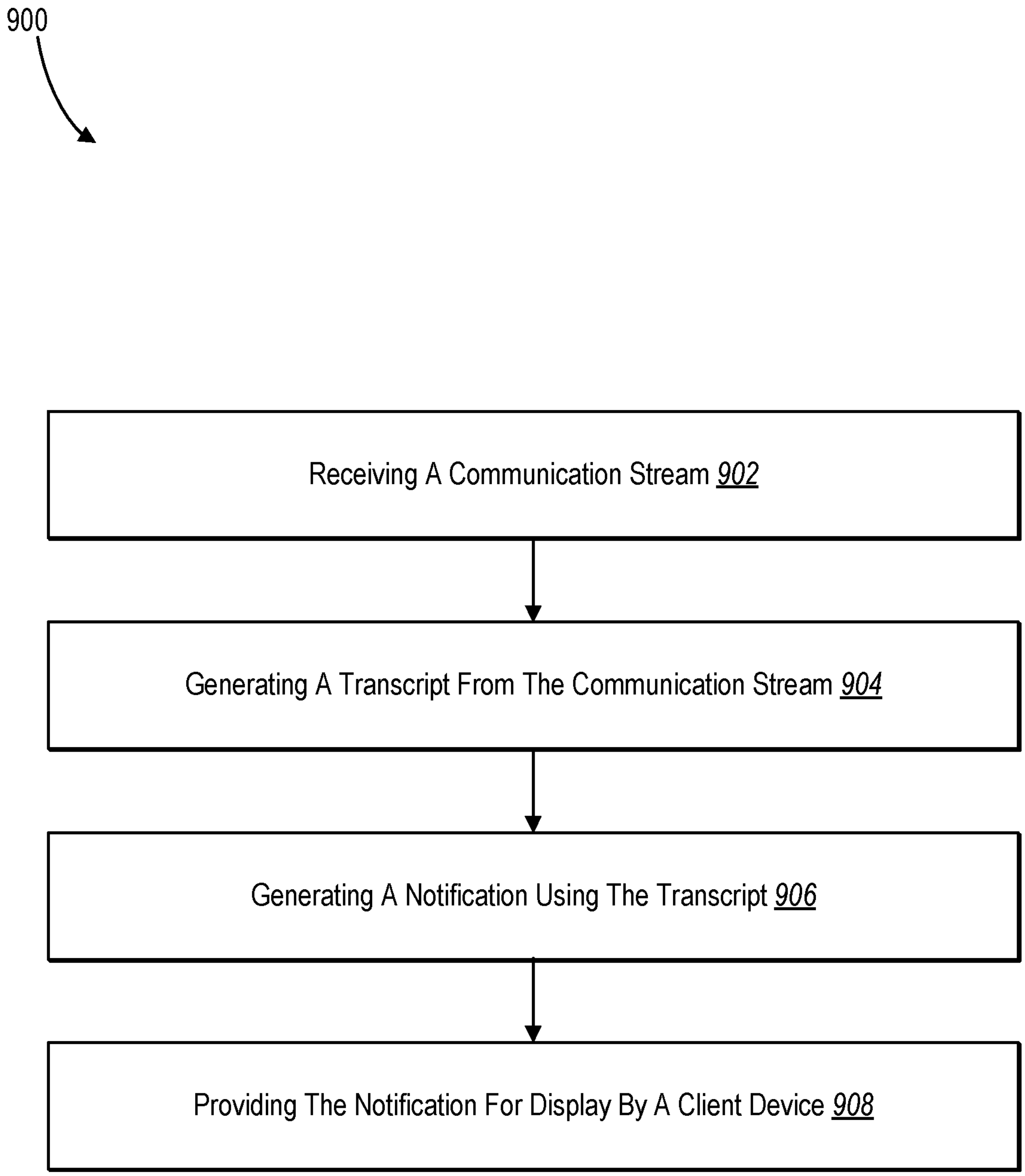
FIG. 9 illustrates a flowchart of a series of acts for generating and providing a notification to a communication participant during the communication in accordance with one or more embodiments.
Figure 10:
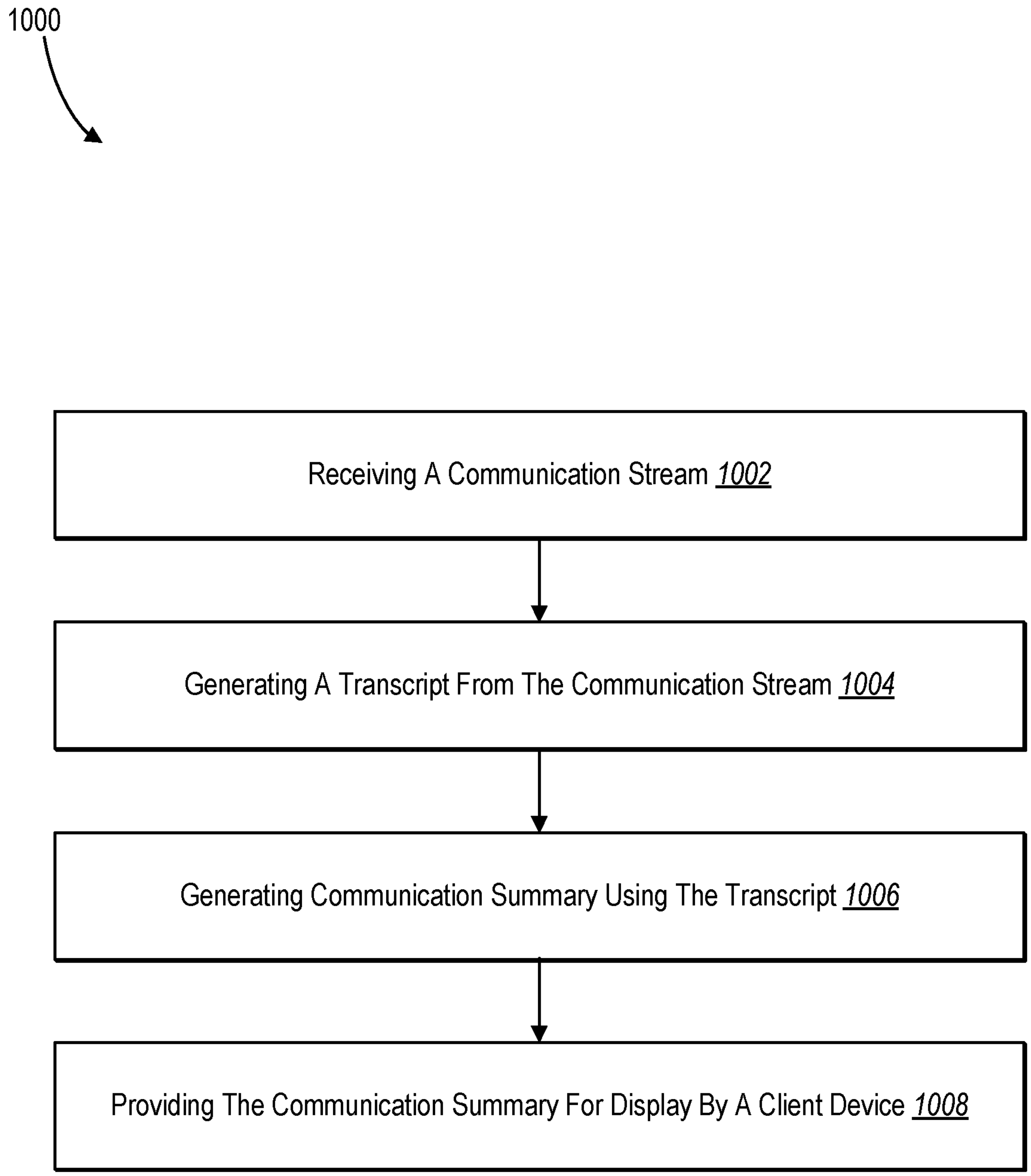
FIG. 10 illustrates a flowchart of a series of acts for generating and providing a communication summary for a communication in accordance with one or more embodiments.

FIGS. 1-8, the corresponding text, and the examples provide a number of different methods, systems, devices, and non-transitory computer-readable media of the real-time assist system 106. In addition to the foregoing, one or more embodiments can also be described in terms of flowcharts comprising acts for accomplishing the particular result, as shown in FIGS. 9-10. FIGS. 9-10 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating and providing a notification to a communication participant during the communication in accordance with one or more embodiments. FIG. 9 illustrates acts according to one embodiment, alternative embodiments may omit, add to, reorder, and/or modify any of the acts shown in FIG. 9. In some implementations, the acts of FIG. 9 are performed as part of a method. Alternatively, a non-transitory computer-readable medium can store instructions thereon that, when executed by at least one processor, cause a computer device to perform the acts of FIG. 9. In some embodiments, a system performs the acts of FIG. 9. For example, in one or more embodiments, a system includes at least one processor and at least one non-transitory computer-readable medium storing instructions that, when executed by the at least one processor, cause the system to perform the acts of FIG. 9.

The series of acts 900 includes an act 902 for receiving a communication stream. For example, the act 902 can involve receiving, from a client device of a first user and during a communication between the first user and a second user, a communication stream containing contents of the communication.

The series of acts 900 also includes an act 904 for generating a transcript from the communication stream. For instance, the act 904 can involve generating, from the communication stream and during the communication, a transcript having a textual representation of the contents of the communication. In one or more embodiments, generating the transcript from the communication stream comprises generating, from the communication stream, a transcript snippet that corresponds to a segment of the communication that begins and ends with speech from the first user or the second user.

Additionally, the series of acts 900 includes an act 906 for generating a notification using the transcript. To illustrate, the act 906 can involve generating, using the transcript and during the communication, a notification for the first user with respect to the contents of the communication.

In some embodiments, generating the notification for the first user using the transcript comprises: determining a presence of one or more triggering utterances within the transcript; identifying a pre-configured rule associated with the one or more triggering utterances; and generating the notification to prompt one or more utterances from the first user to the second user in accordance with the pre-configured rule.

In some instances, generating the notification for the first user using the transcript comprises: determining a presence of one or more triggering utterances within the transcript; locating a digital content item related to the one or more triggering utterances; and generating the notification to include a link to the digital content item. In some cases, locating the digital content item comprises locating a plurality of digital content items from a plurality digital content sources; and generating the notification to include the link to the digital content item comprises generating the notification to include a plurality of links to the plurality of digital content items. Further, in some embodiments, the real-time assist system 106 receives, via the graphical user interface of the client device, a user selection of at least one link from the plurality of links; retrieves, in response to the user selection, at least one digital content item associated with the at least one link from a corresponding digital content source; and provides the at least one digital content item for display within the graphical user interface of the client device. In some cases, locating the digital content item related to the one or more triggering utterances comprises: generating a search query using the one or more triggering utterances and a topic associated with the one or more triggering utterances; and locating the digital content item based on the search query using a semantic search engine.

In one or more embodiments, the real-time assist system 106 generates, during the communication, contextual information corresponding to the contents of the communication using a natural language processing model; and generates, during the communication, an enriched transcript that includes the textual representation of the contents of the communication and the contextual information. Accordingly, in some cases, generating the notification for the first user using the transcript comprises generating the notification for the first user using the enriched transcript. In some embodiments, generating the contextual information corresponding to the contents of the communication using the natural language processing model comprises using the natural language processing model to generate an indication of a topic, a sentiment, or an emotion associated with the contents of the communication.

In some implementations, the real-time assist system 106 determines that the communication has reached a threshold time established by a pre-configured rule. As such, the real-time assist system 106 can generate the notification to prompt one or more utterances from the first user to the second user in accordance with the pre-configured rule.

In some cases, the real-time assist system 106 provides, for display within a graphical user interface of an additional client device, one or more interactive options for establishing or modifying a pre-configured rule related to generating notifications based on communications; and establishes or modifies the pre-configured rule in response to one or more user interactions with the one or more interactive options. Accordingly, in some instances, generating the notification for the first user with respect to the contents of the communication comprises generating the notification in accordance with the pre-configured rule.

Further, the series of acts 900 includes an act 908 for providing the notification for display by a client device. For instance, the act 908 can involve providing the notification for display within a graphical user interface of the client device of the first user during the communication.

FIG. 10 illustrates a flowchart of a series of acts 1000 for generating and providing a communication summary for a communication in accordance with one or more embodiments. FIG. 10 illustrates acts according to one embodiment, alternative embodiments may omit, add to, reorder, and/or modify any of the acts shown in FIG. 10. In some implementations, the acts of FIG. 10 are performed as part of a method. Alternatively, a non-transitory computer-readable medium can store instructions thereon that, when executed by at least one processor, cause a computer device to perform the acts of FIG. 10. In some embodiments, a system performs the acts of FIG. 10. For example, in one or more embodiments, a system includes at least one processor and at least one non-transitory computer-readable medium storing instructions that, when executed by the at least one processor, cause the system to perform the acts of FIG. 10.

The series of acts 1000 includes an act 1002 for receiving a communication stream. For instance, the act 1002 can involve receiving, from a client device of a first user, a communication stream containing contents of a communication between the first user and a second user.

The series of acts 1000 also includes an act 1004 for generating a transcript from the communication stream. For example, the act 1004 can involve generating, from the communication stream, a transcript having a textual representation of the contents of the communication.

Additionally, the series of acts 1000 includes an act 1006 for generating a communication summary using the transcript. To illustrate, the act 1006 can involve generating, using the transcript, a communication summary that describes the contents of the communication.

In one or more embodiments, the real-time assist system 106 generates a summary template having a content structure and one or more entry fields within the content structure. As such, in some embodiments, generating the communication summary using the transcript comprises generating the communication summary to include at least one content entry within the one or more entry fields based on the textual representation of the transcript. In some implementations, generating the summary template having the content structure and the one or more entry fields within the content structure comprises generating, within the summary template, an entry field corresponding to at least one of a call reason, an action item, or a topic discussed during the communication; and generating the communication summary to include the at least one content entry within the one or more entry fields based on the textual representation of the transcript comprises using a categorization model to generate a content entry by generating a call reason entry, an action item entry, or a topic entry based on the textual representation of the transcript.

In some cases, the real-time assist system 106 provides, for display within a graphical user interface of an additional client device, one or more interactive options for generating or modifying a pre-configured rule for generating content entries for communication summaries; and generates or modifying the pre-configured rule in response to one or more user interactions with the one or more interactive options. As such, in some cases, using the categorization model to generate the content entry comprises using the categorization model to generate the content entry in accordance with the pre-configured rule. In some embodiments, the real-time assist system 106 generating a pre-configured rule for generates content entries for communication summaries using a large language model. Accordingly, in some instances, using the categorization model to generate the content entry comprises using the categorization model to generate the content entry in accordance with the pre-configured rule.

In one or more embodiments, generating the communication summary using the transcript comprises generating the communication summary using a large language model based on the transcript. Further, in some embodiments, the real-time assist system 106 generates a redacted transcript by redacting personally identifiable information associated with the first user or the second user from the transcript. Accordingly, in some instances, generating the communication summary using the transcript comprises generating the communication summary using the redacted transcript.

In one or more embodiments, the real-time assist system 106 determines personally identifiable information associated with the first user or the second user from metadata related to the communication; and generates the communication summary to include the personally identifiable information.

Further, the series of acts 1000 includes an act 1008 for providing the communication summary for display by a client device. For instance, the act 1008 can involve providing the communication summary for display within a graphical user interface of the client device of the first user.

In some embodiments, the real-time assist system 106 further receives, via the graphical user interface of the client device of the first user, one or more user interactions with respect to the communication summary; and modifies the communication summary in response to the one or more user interactions.

Embodiments of the present disclosure can comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions can be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
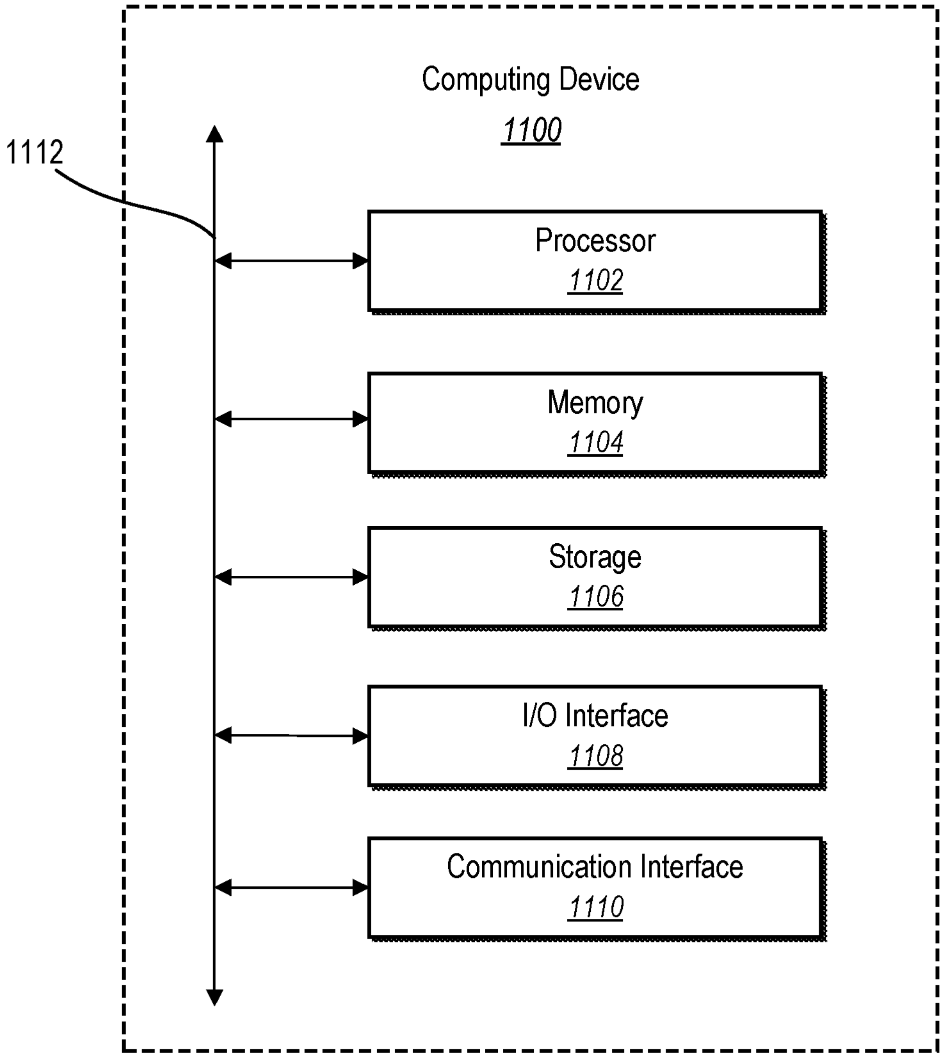
FIG. 11 illustrates a block diagram of an exemplary computing device in accordance with one or more embodiments.

FIG. 11 illustrates a block diagram of computing device 1100 that can be configured to perform one or more of the processes described above. One will appreciate that one or more computing devices, such as the computing device 1100, can implement the various devices of the environment of FIG. 1. As shown by FIG. 11, the computing device 1100 can comprise a processor 1102, a memory 1104, a storage device 1106, an I/O interface 1108, and a communication interface 1110, which can be communicatively coupled by way of a communication interface 1110. While a computing device 1100 is shown in FIG. 11, the components illustrated in FIG. 11 are not intended to be limiting. Additional or alternative components can be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions, the processor 1102 can retrieve (or fetch) the instructions from an internal register, an internal cache, the memory 1104, or the storage device 1106 and decode and execute them. In one or more embodiments, the processor 1102 can include one or more internal caches for data, instructions, or addresses. As an example, and not by way of limitation, the processor 1102 can include one or more instruction caches, one or more data caches, and one or more translation lookaside buffers (TLBs). Instructions in the instruction caches can be copies of instructions in the memory 1104 or the storage device 1106.

The memory 1104 can be used for storing data, metadata, and programs for execution by the processor(s). The memory 1104 can include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 can be internal or distributed memory.

The storage device 1106 includes storage for storing data or instructions. As an example, and not by way of limitation, storage device 1106 can comprise a non-transitory storage medium described above. The storage device 1106 can include a hard disk drive (HDD), a floppy disk drive, flash memory, an optical disc, a magneto-optical disc, magnetic tape, or a Universal Serial Bus (USB) drive or a combination of two or more of these. The storage device 1106 can include removable or non-removable (or fixed) media, where appropriate. The storage device 1106 can be internal or external to the computing device 1100. In one or more embodiments, the storage device 1106 is non-volatile, solid-state memory. In other embodiments, the storage device 1106 includes read-only memory (ROM). Where appropriate, this ROM can be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from computing device 1100. The I/O interface 1108 can include a mouse, a keypad or a keyboard, a touch screen, a camera, an optical scanner, network interface, modem, other known I/O devices or a combination of such I/O interfaces. The I/O interface 1108 can include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data can be representative of one or more graphical user interfaces and/or any other graphical content as can serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 can include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1110 can facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, the communication interface 1110 can facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 can facilitate communications various communication protocols. Examples of communication protocols that can be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication interface 1110 can include hardware, software, or both that couples components of the computing device 1100 to each other. As an example and not by way of limitation, the communication interface 1110 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
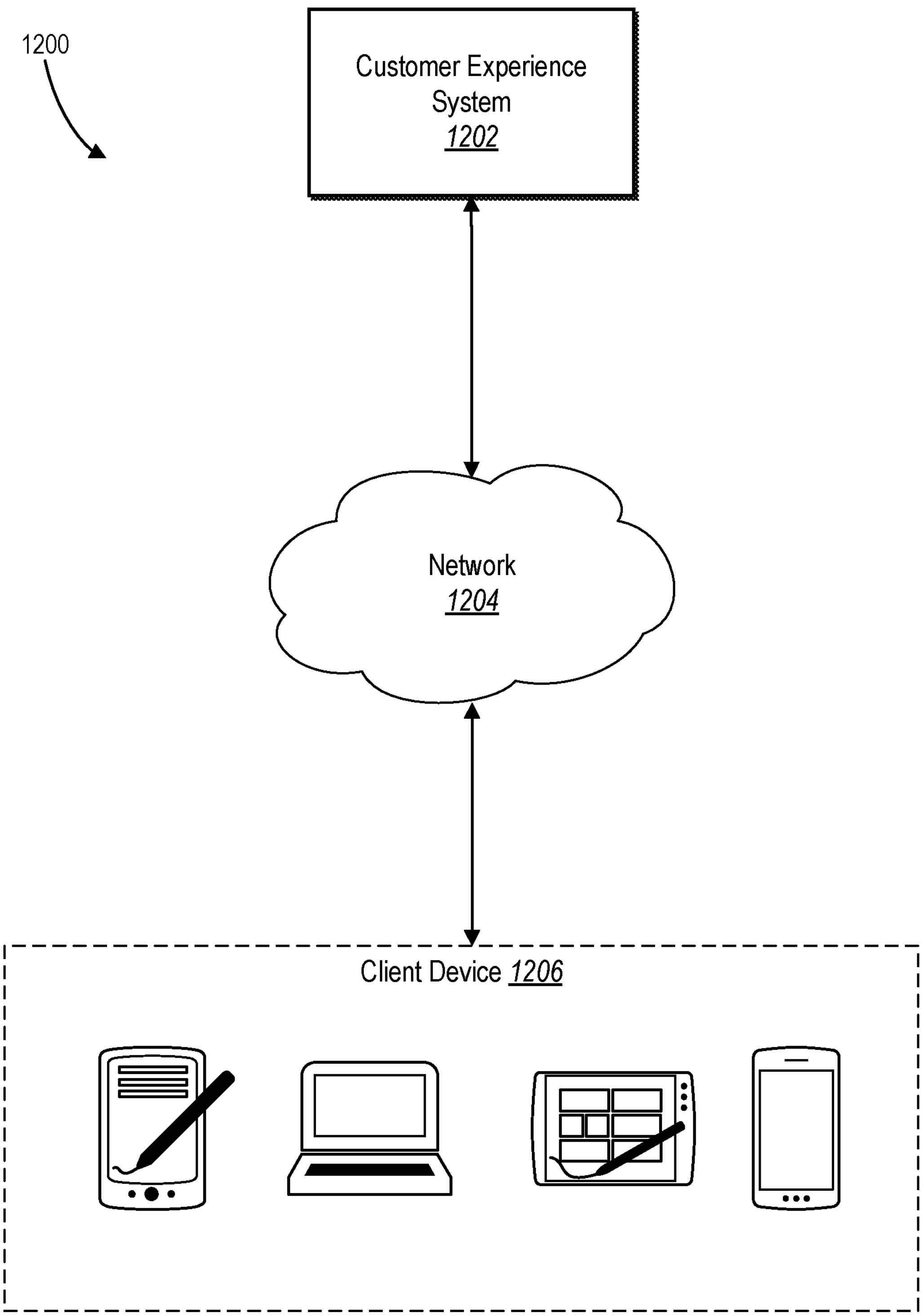
FIG. 12 illustrates a network environment of a customer experience system in accordance with one or more embodiments.

FIG. 12 illustrates an example network environment 1200. Network environment 1200 includes a client system 1206, and a customer experience system 1202 connected to each other by a network 1204. Although FIG. 12 illustrates a particular arrangement of client system 1206, customer experience system 1202, and network 1204, this disclosure contemplates any suitable arrangement of client system 1206, customer experience system 1202, and network 1204. As an example, and not by way of limitation, two or more of client system 1206, and customer experience system 1202 can be connected to each other directly, bypassing network 1204. As another example, two or more of client system 1206 and customer experience system 1202 can be physically or logically co-located with each other in whole, or in part. Moreover, although FIG. 12 illustrates a particular number of client systems 1206, customer experience system 1202, and network 1204, this disclosure contemplates any suitable number of client systems 1206, customer experience system 1202, and network 1204. As an example, and not by way of limitation, network environment 1200 can include multiple client systems 1206, customer experience system 1202, and network 1204.

This disclosure contemplates any suitable network 1204. As an example and not by way of limitation, one or more portions of network 1204 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 can include one or more networks.

Links can connect client system 1206, and customer experience system 1202 to network 1204 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links can differ in one or more respects from one or more second links.

In particular embodiments, client system 1206 can be an electronic device including hardware, software, or embedded logic components or a combination of two or more such components and capable of carrying out the appropriate functionalities implemented or supported by client system 1206. As an example, and not by way of limitation, a client system 1206 can include any of the computing devices discussed above in relation to FIG. 12. A client system 1206 can enable a network user at client system 1206 to access network 1204. A client system 1206 can enable its user to communicate with other users at other client devices or systems.

In particular embodiments, client system 1206 can include a web browser, such as MICROSOFT EDGE, GOOGLE CHROME, or MOZILLA FIREFOX, and can have one or more add-ons, plug-ins, or other extensions, such as TOOLBAR or YAHOO TOOLBAR. A user at client system 1206 can enter a Uniform Resource Locator (URL) or other address directing the web browser to a particular server (such as server, or a server associated with a third-party system), and the web browser can generate a Hyper Text Transfer Protocol (HTTP) request and communicate the HTTP request to server. The server can accept the HTTP request and communicate to client system 1206 one or more Hyper Text Markup Language (HTML) files responsive to the HTTP request. Client system 1206 can render a webpage based on the HTML files from the server for presentation to the user. This disclosure contemplates any suitable webpage files. As an example, and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, customer experience system 1202 can include a variety of servers, sub-systems, programs, modules, logs, and data stores. In particular embodiments, customer experience system 1202 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Customer experience system 1202 can also include suitable components such as network interfaces, security mechanisms, load balancers, failover servers, management-and-network-operations consoles, other suitable components, or any suitable combination thereof.

In particular embodiments, customer experience system 1202 can include one or more user-profile stores for storing user profiles. A user profile can include, for example, biographic information, demographic information, behavioral information, social information, or other types of descriptive information, such as work experience, educational history, hobbies or preferences, interests, affinities, or location. Interest information can include interests related to one or more categories. Categories can be general or specific.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:

receiving, from a client device of a first user and during a communication between the first user and a second user, a communication stream containing contents of the communication;

generating, from the communication stream and during the communication, a transcript having a textual representation of the contents of the communication;

generating, using a natural language processing model and during the communication, an enriched transcript from the transcript, the enriched transcript including the textual representation of the contents of the communication and including contextual information corresponding to the contents of the communication;

determining that the communication has triggered a pre-configured rule;

generating, using the enriched transcript and during the communication, a notification having text content instructing the first user to perform an action as part of the communication in accordance with the pre-configured rule; and providing the notification for display within a graphical user interface of the client device of the first user during the communication.

2. The method of claim 1, further comprising:

generating, during the communication, the contextual information corresponding to the contents of the communication using the natural language processing model by using the natural language processing model to derive the contextual information from one or more explicit statements made during the communication.

3. The method of claim 1, wherein generating the contextual information corresponding to the contents of the communication using the natural language processing model comprises using the natural language processing model to generate an indication of a topic, a sentiment, or an emotion associated with the contents of the communication.

4. The method of claim 1, wherein generating the transcript from the communication stream comprises generating, from the communication stream, a transcript snippet that corresponds to a segment of the communication that begins and ends with speech from the first user or the second user.

5. The method of claim 1, wherein:

determining that the communication has triggered the pre-configured rule comprises:

determining a presence of one or more triggering utterances within the transcript; and determining that the pre-configured rule is associated with the one or more triggering utterances; and generating the notification having the text content instructing the first user to perform the action as part of the communication in accordance with the pre-configured rule comprises generating the notification to prompt one or more utterances from the first user to the second user in accordance with the pre-configured rule.

6. The method of claim 1, wherein:

determining that the communication has triggered the pre-configured rule comprises determining that the communication has reached a threshold time established by the pre-configured rule; and generating the notification having the text content instructing the first user to perform the action as part of the communication in accordance with the pre-configured rule comprises generating the notification to prompt one or more utterances from the first user to the second user in accordance with the pre-configured rule.

7. The method of claim 1, wherein:

determining that the communication has triggered the pre-configured rule comprises determining a presence of one or more triggering utterances within the transcript; and generating the notification having the text content instructing the first user to perform the action as part of the communication in accordance with the pre-configured rule comprises:

locating a digital content item related to the one or more triggering utterances; and generating the notification to include a link to the digital content item.

8. The method of claim 7, wherein:

locating the digital content item comprises locating a plurality of digital content items from a plurality digital content sources; and generating the notification to include the link to the digital content item comprises generating the notification to include a plurality of links to the plurality of digital content items.

9. The method of claim 8, further comprising:

receiving, via the graphical user interface of the client device, a user selection of at least one link from the plurality of links;

retrieving, in response to the user selection, at least one digital content item associated with the at least one link from a corresponding digital content source; and providing the at least one digital content item for display within the graphical user interface of the client device.

10. The method of claim 7, wherein locating the digital content item related to the one or more triggering utterances comprises:

generating a search query using the one or more triggering utterances and a topic associated with the one or more triggering utterances; and locating the digital content item based on the search query using a semantic search engine.

11. The method of claim 1, further comprising:

providing, for display within a graphical user interface of an additional client device, one or more interactive options for establishing or modifying a pre-configured rule related to generating notifications based on communications; and establishing or modifying the pre-configured rule in response to one or more user interactions with the one or more interactive options, wherein generating the notification for the first user with respect to the contents of the communication comprises generating the notification in accordance with the pre-configured rule.

12. A non-transitory computer-readable medium storing instructions that, when executed by at least one processor, cause a computer device to:

receive, from a client device of a first user and during a communication between the first user and a second user, a communication stream containing contents of the communication;

generate, from the communication stream and during the communication, a transcript having a textual representation of the contents of the communication;

generate, using a natural language processing model and during the communication, an enriched transcript from the transcript, the enriched transcript including the textual representation of the contents of the communication and including contextual information corresponding to the contents of the communication;

determine that the communication has triggered a pre-configured rule;

generate, using the enriched transcript and during the communication, a notification having text content instructing the first user to perform an action as part of the communication in accordance with the pre-configured rule; and provide the notification for display within a graphical user interface of the client device of the first user during the communication.

13. The non-transitory computer-readable medium of claim 12, further comprising instructions that, when executed by the at least one processor, cause the computer device to:

generate, during the communication, the contextual information corresponding to the contents of the communication using the natural language processing model by using the natural language processing model to derive the contextual information from one or more explicit statements made during the communication.

14. The non-transitory computer-readable medium of claim 12, further comprising instructions that, when executed by the at least one processor, cause the computer device to generate the contextual information corresponding to the contents of the communication using the natural language processing model by using the natural language processing model to generate an indication of a topic, a sentiment, or an emotion associated with the contents of the communication.

15. The non-transitory computer-readable medium of claim 12, further comprising instructions that, when executed by the at least one processor, cause the computer device to generate the transcript from the communication stream by generating, from the communication stream, a transcript snippet that corresponds to a segment of the communication that begins and ends with speech from the first user or the second user.

16. The non-transitory computer-readable medium of claim 12, further comprising instructions that, when executed by the at least one processor, cause the computer device to:

determine that the communication has triggered the pre-configured rule by:

determining a presence of one or more triggering utterances within the transcript; and determining that the pre-configured rule is associated with the one or more triggering utterances; and generate the notification having the text content instructing the first user to perform the action as part of the communication in accordance with the pre-configured rule by generating the notification to prompt one or more utterances from the first user to the second user in accordance with the pre-configured rule.

17. The non-transitory computer-readable medium of claim 12, further comprising instructions that, when executed by the at least one processor, cause the computer device to:

determine that the communication has triggered the pre-configured rule by determining that the communication has reached a threshold time established by a pre-configured rule; and generate the notification having the text content instructing the first user to perform the action as part of the communication in accordance with the pre-configured rule by generating the notification to prompt one or more utterances from the first user to the second user in accordance with the pre-configured rule.

18. A system comprising:

at least one processor; and at least one non-transitory computer-readable storage medium storing instructions that, when executed by the at least one processor, cause the system to:

receive, from a client device of a first user and during a communication between the first user and a second user, a communication stream containing contents of the communication;

generate, from the communication stream and during the communication, a transcript having a textual representation of the contents of the communication;

generate, using a natural language processing model and during the communication, an enriched transcript from the transcript, the enriched transcript including the textual representation of the contents of the communication and including contextual information corresponding to the contents of the communication;

determine that the communication has triggered a pre-configured rule;

generate, using the enriched transcript and during the communication, a notification having text content instructing the first user to perform an action as part of the communication in accordance with the pre-configured rule; and provide the notification for display within a graphical user interface of the client device of the first user during the communication.

19. The system of claim 18, further comprising instructions that, when executed by the at least one processor, cause the system to:

determine that the communication has triggered the pre-configured rule by determining a presence of one or more triggering utterances within the transcript; and generate the notification having the text content instructing the first user to perform the action as part of the communication in accordance with the pre-configured rule by:

locating a digital content item related to the one or more triggering utterances; and generating the notification to include a link to the digital content item.

20. The system of claim 19, wherein:

locating the digital content item comprises locating a plurality of digital content items from a plurality digital content sources; and generating the notification to include the link to the digital content item comprises generating the notification to include a plurality of links to the plurality of digital content items.

* * * * *